United States Patent
Kobayashi et al.

(10) Patent No.: US 7,719,987 B2
(45) Date of Patent: May 18, 2010

(54) RADIO COMMUNICATION DEVICE AND ROUTE SEARCH METHOD

(75) Inventors: Hirokazu Kobayashi, Tokyo (JP); Toyoki Kawahara, Tokyo (JP); Takeshi Kanazawa, Kanagawa (JP); Naoto Oka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1122 days.

(21) Appl. No.: 10/569,347

(22) PCT Filed: Mar. 15, 2005

(86) PCT No.: PCT/JP2005/004497
§ 371 (c)(1), (2), (4) Date: Feb. 22, 2006

(87) PCT Pub. No.: WO2005/091576
PCT Pub. Date: Sep. 29, 2005

(65) Prior Publication Data
US 2006/0293061 A1     Dec. 28, 2006

(30) Foreign Application Priority Data
Mar. 18, 2004  (JP)  ............................ 2004-077478
Mar. 9, 2005   (JP)  ............................ 2005-065290

(51) Int. Cl.
G08C 15/00   (2006.01)
H04B 7/00    (2006.01)
(52) U.S. Cl. ..................................... 370/238; 455/41.2
(58) Field of Classification Search ................ 370/229, 370/265, 238, 246, 252; 455/445, 3.03, 41.2, 455/500
See application file for complete search history.

(56) References Cited

U.S. PATENT DOCUMENTS

| 7,414,977 | B2* | 8/2008 | Orlik et al. | 370/238 |
| 7,450,521 | B2 | 11/2008 | Park et al. | |
| 2002/0191573 | A1 | 12/2002 | Whitehill et al. | |
| 2003/0202468 | A1* | 10/2003 | Cain et al. | 370/229 |
| 2004/0165532 | A1* | 8/2004 | Poor et al. | 370/238 |

FOREIGN PATENT DOCUMENTS

JP    02-001665 A    1/1990

(Continued)

OTHER PUBLICATIONS

Perkins et al., "Ad-hoc On-Demand Distance Vector Routing", pp. 1-11.*

(Continued)

*Primary Examiner*—George Eng
*Assistant Examiner*—Nam Huynh
(74) *Attorney, Agent, or Firm*—RatnerPrestia

(57) ABSTRACT

A radio communication device includes a reception unit for receiving a route request message from another radio communication device, a route control message processing unit for judging whether the received route request message is addressed to itself or not, a route request message management unit for deciding a delay amount for delaying response transmission or relay forwarding with regard to the route request message according to an operating state of the radio communication device when the route request message is not addressed to itself, and a delay processing unit which performs response transmission or relay forwarding to the route request message when the delay amount time has expired. Thus, a route selected giving preference to radio communication devices having a preferable operating state can be obtained.

10 Claims, 29 Drawing Sheets

FOREIGN PATENT DOCUMENTS

| | | |
|---|---|---|
| JP | 09-149079 A | 6/1997 |
| JP | 2003-152786 A | 5/2003 |
| JP | 2003-283560 A | 10/2003 |
| JP | 2004-531971 A | 10/2004 |
| JP | 2004-336782 A | 11/2004 |
| JP | 2004-356950 A | 12/2004 |
| JP | 2005-045654 A | 2/2005 |
| JP | 2005-229624 A | 8/2005 |
| JP | 2005-529538 A | 9/2005 |
| JP | 2005-065290 | 2/2010 |
| WO | WO 02/103610 A2 | 12/2002 |
| WO | WO 03/105356 A1 | 12/2003 |

OTHER PUBLICATIONS

International Search Report for PCT/JP2005/004497, dated Jun. 28, 2005.

Kobayashi, et al., "Investigation of routing protocol based on the attributes of a terminal for Mobile Ad hoc Network," Technical Report of IEICE NS 2004-2, Apr. 15, 2004 (with English abstract).

Kobayashi, et al., "Investigation of on-demand routing protocol based on the attributes of a terminal for Mobile Ad hoc Network," Technical Report of IEICE NS 2004-131, Oct. 14, 2004 (with English abstract).

Perkins, et al., "Ad-hoc On-Demand Distance Vector Routing," pp. 1-11.

Supplementary European Search Report for Application No. EP 05 72 0754, Jan. 13, 2010, Panasonic Corporation.

Jiang M-H et al., "An efficient multiple-path routing protocol for ad hoc networks", Computer Communications, Elsevier Science Publishers BV, Amsterdam, NL, vol. 25, No. 5, Mar. 15, 2002, pp. 478-484, XP004332672, ISSN: 0140-3664.

Perkins C E et al., "Ad-hoc On-Demand Distance Vector Routing", Proceedings WMCSA, XX, XX, Feb. 25, 1999, pp. 90-100, XP002173721.

Johnson D B et al., "Protocols for Adaptive Wireless and Mobile Networking", IEEE Personal Communications, IEEE Communications Society, US, vol. 3, No. 1, Feb. 1, 1996, pp. 34-42, ISSN: 1070-9916.

* cited by examiner

FIG.5

| MESSAGE IDENTIFIER | FLAG GROUP | RESERVED | HOP COUNT |
|---|---|---|---|
| ROUTE REQUEST MESSAGE IDENTIFIER ||||
| DESTINATION RADIO COMMUNICATION DEVICE IDENTIFIER ||||
| DESTINATION RADIO COMMUNICATION DEVICE SEQUENCE NUMBER ||||
| SOURCE RADIO COMMUNICATION DEVICE IDENTIFIER ||||
| SOURCE RADIO COMMUNICATION DEVICE SEQUENCE NUMBER ||||

| MESSAGE IDENTIFIER | FLAG GROUP | RESERVED | PREFIX SIZE | HOP COUNT |
|---|---|---|---|---|
| DESTINATION RADIO COMMUNICATION DEVICE IDENTIFIER |||||
| DESTINATION RADIO COMMUNICATION DEVICE SEQUENCE NUMBER |||||
| SOURCE RADIO COMMUNICATION DEVICE IDENTIFIER |||||
| LIFETIME |||||

| RADIO COMMUNICATION DEVICE | REMAINING BATTERY CAPACITY |
|---|---|
| B | LOW |
| C | LOW |
| D | HIGH |
| E | MIDDLE |
| F | MIDDLE |
| G | HIGH |

FIG.10

| DESTINATION IDENTIFIER | NEXT HOP IDENTIFIER | SEQUENCE NUMBER | HOP COUNT |
|---|---|---|---|
| G | D | 20 | 3 |
| F | D | 2 | 2 |
| E | B | 4 | 2 |

| SOURCE IDENTIFIER | DESTINATION IDENTIFIER | ROUTE REQUEST MESSAGE IDENTIFIER | TIMER VALID FLAG | TIMER VALUE |
|---|---|---|---|---|
| B | H | 3 | VALID | 10 |
| B | E | 2 | INVALID | 4 |
| F | G | 17 | VALID | 14 |

| INDEX 1301 | SOURCE IDENTIFIER 1101 | DESTINATION IDENTIFIER 1102 | ROUTE REQUEST MESSAGE IDENTIFIER 1103 | TIMER VALID FLAG 1104 | TIMER VALUE 1105 |
|---|---|---|---|---|---|
| 1 | B | H | 3 | VALID | 10 |
| 2 | B | E | 2 | INVALID | 4 |
| 3 | F | G | 17 | VALID | 14 |

FIG.14

| NEIGHBORING RADIO COMMUNICATION DEVICE IDENTIFIER 1401 | INDEX RECEIVING STATE 1402 | | |
|---|---|---|---|
| | 1 | 2 | 3 |
| B | RECEIVED | RECEIVED | RECEIVED |
| C | NOT RECEIVED | NOT RECEIVED | RECEIVED |
| D | NOT RECEIVED | NOT RECEIVED | NOT RECEIVED |

FIG.18

| TOTAL NUMBER OF NEIGHBORING RADIO COMMUNICATION DEVICES | NEIGHBORING RADIO COMMUNICATION DEVICE IDENTIFIER | RECEIVING TIME | VALID FLAG |
|---|---|---|---|
| 3 | G | 10212 | VALID |
|   | F | 10220 | VALID |
|   | E | 09857 | INVALID |

FIG.21

| TOTAL NUMBER OF VALID ROUTE INFORMATION | DESTINATION IDENTIFIER | NEXT HOP IDENTIFIER | SEQUENCE NUMBER | LIFE TIME | VALID FLAG |
|---|---|---|---|---|---|
| 2 | G | D | 20 | 12427 | VALID |
| | F | D | 2 | 10822 | VALID |
| | E | B | 4 | 00251 | INVALID |

FIG.23

| REMAINING BATTERY CAPACITY | TOTAL NUMBER OF NEIGHBORING RADIO COMMUNICATION DEVICES | | |
|---|---|---|---|
| | 0~3 | 4~6 | 7~ |
| HIGH | 0 | T1 | T2 |
| MIDDLE | T3 | T4 | T5 |
| LOW | T6 | T7 | T8 |

| MESSAGE IDENTIFIER | FLAG GROUP | FLOW KIND | HOP COUNT |
|---|---|---|---|
| ROUTE REQUEST MESSAGE IDENTIFIER ||||
| DESTINATION RADIO COMMUNICATION DEVICE IDENTIFIER ||||
| DESTINATION RADIO COMMUNICATION DEVICE SEQUENCE NUMBER ||||
| SOURCE RADIO COMMUNICATION DEVICE IDENTIFIER ||||
| SOURCE RADIO COMMUNICATION DEVICE SEQUENCE NUMBER ||||

2601

US 7,719,987 B2

RADIO COMMUNICATION DEVICE AND ROUTE SEARCH METHOD

This application is a U.S. National Phase Application of PCT International Application PCT/JP2005/004497.

TECHNICAL FIELD

The invention relates to a radio communication device and a route discovery method in a radio ad hoc network system, more particularly, relates to a radio communication device and a route discovery method which searches an optimum route in the ad hoc network system.

BACKGROUND ART

With the diversity of radio communication devices possessed by users, it is becoming possible to send e-mail from radio communication devices, use the Internet and exchange data at offices, on street corners, in transport vehicles during movement, or the like. The existence of infrastructure is a prerequisite for these radio networks. On the other hand, an ad hoc network has begun to attract attention which does not require infrastructure, in which a radio communication device performs communication by constructing networks temporarily with radio communication devices scattered in neighboring areas. The ad hoc network is a system which enables communication using a multiple step connection via several radio communication devices when a radio communication device cannot communicate with the desired radio communication device directly, and a problem is what route the radio communication device should take to forward data to the destination radio communication device.

As a route discovery method in a conventional ad hoc network, when a communication request takes place in the radio communication device, there is "The Ad hoc On Demand Distance Vector" method (hereinafter, referred to as "AODV" method) which starts a route discovery in the case that the device does not have route information to the destination, and thereby acquires the shortest hop route to the destination. (For example, refer to 'Proceedings of the 2nd IEEE Workshop on Mobile computing Systems and Applications, pages 90-100, February 1999' in "Ad Hoc On-Demand Distance-Vector Routing" attributed to C. Perkins and E. Royer,).

The AODV method, used when transmitting data to a radio communication device of a certain destination and in the case where there is no existing valid route, starts a route discovery process and broadcasts a route request message which includes its own sequence number, a destination sequence number which it has, and a route request message identifier. When the adjacent radio communication device does not have sufficiently new route information on the route to the destination radio communication device, the adjacent radio communication device establishes a route in the reverse direction to the radio communication device which has transmitted the received route request message, and broadcasts the same route request message. However, a route request message which had already been received is not broadcast is. The destination radio communication device or the radio communication device which has sufficiently new route to the destination transmits a route reply message which stores the current sequence number of the destination radio communication device to the radio communication device which is the source of the route request message by unicasting. The radio communication device which has received the route reply message updates its route information based on information in the route reply message and forwards the route reply message to the radio communication device which has made the route request message using the route in the reverse direction if the sequence number of the destination is the newest one or if the sequence number is the same but the hop count to the destination is small. When the route reply message arrives at the radio communication device which has made the route request message, the route to the destination radio communication device is established.

A method not applying the route based on the shortest hop count is disclosed, in which radio communication devices adjacent to each other set a bit-error rate and forwarding speed, and based on them, the weighting of a link is calculated in each radio communication device and these link weights are added to the route request message, and then, the destination radio communication device selects the optimum route and responds to the message (for example, refer to JP-A-2003-152786).

However, in the conventional configuration, the route is established according to only the freshness of route information, determined from the sequence number, and the hop count, and therefore a radio communication device along the route which has insufficient battery remaining power happens to be selected. In this case, if the battery of the selected radio communication device is exhausted, the route becomes invalid and the route discovery procedure is performed in the ad hoc network again. Accordingly, there are problems that power consumption of all radio communication devices increases, and that throughput decreases due to the overhead increase in the communication band caused by control messages.

In another conventional configuration, since the weighing is calculated for the link between radio communication devices adjacent to each other, the search for neighboring radio communication devices and a link connection procedure are required when searching the route. Accordingly, there are problems that processing for each radio communication device increases and that the overhead increases because of signaling.

DISCLOSURE OF THE INVENTION

An object of the invention is to provide a radio communication device and a route discovery method capable of obtaining an appropriate route easily in accordance with the operating state characteristics of radio communication devices such as battery remaining power, relay load, or type of data flow, without complicated calculation or increasing of the overhead for searching the route in the radio communication device.

A route discovery method of the invention, used for obtaining route information to a destination when a radio communication device connected in a network requires route information to a destination radio communication device, is a destination route discovery method including a step in which a radio communication device receives a route request message including a source address, a destination address, and a route request message identifier that is broadcast throughout the network, a step in which the radio communication device decides a delay time amount for delaying processing of response transmission or relay forwarding with respect to the route request message based on its operating state, as a reaction to the route request message if the received route request message is not one which has already been received and the radio communication device itself is not the destination of the required route, a step in which the radio communication device runs a timer for the delay amount and judges whether the delay time amount has passed or not, and a step in which the radio communication device performs response transmission or relay forwarding with respect to the route request message when the delay time amount has passed. According to this, the radio communication device having the better operating state performs the relay of the route request message or the transmission of a route message response earlier, and therefore, a route selected giving preference to radio communication devices having the better operating state can be obtained without exchanging operating state information of the respective radio communication devices among each other.

In the route discovery method of the invention, the relay forwarding with respect to the route request message by the radio communication device is characterized in that the radio communication device, broadcasts to radio communication devices located in its radio communication area a route request message which includes the source address, the destination address and the route request message identifier of the received route request message when the device does not itself have route information on the route to the destination radio communication device. According to this method, the radio communication device having the better operating state performs the relay processing of the route request message earlier, and therefore, a route selected giving preference to radio communication devices having the better operating state can be obtained without exchanging operating state information of the respective radio communication device among each other.

In the route discovery method of the invention, the response transmission with respect to the route request message by the radio communication device is characterized in that the radio communication device transmits to the source of the received route request message the route reply message which includes the source address and the destination address of the received route request message, when the device has route information on the route to the destination. Accordingly, in the radio communication devices having route information on the route to the destination, the radio communication device having the better operating state performs transmission processing of the route reply message earlier, therefore, a selected giving preference to radio communication devices having the better operating state can be obtained without exchanging operating state information of the respective radio communication devices among each other.

The route discovery method of the invention further includes a step in which the radio communication device monitors its battery remaining power, and is characterized in that with the operating state of the radio communication device being the battery remaining power, the device sets the delay amount smaller when the battery remaining power is larger. Accordingly, the radio communication device whose battery remaining power is larger performs the response or relay processing earlier. Therefore, a route selected giving preference to the radio communication device whose battery remaining power is larger can be obtained without radio communication devices exchanging information of their respective battery remaining power among themselves, and as a result, the usable time of the route can be longer than a conventional method in which a route of the shortest hop count is searched.

The route discovery method of the invention further includes a step in which the radio communication device monitors its battery remaining power and a step in which the radio communication device estimates its remaining operating time from the battery remaining power, and is characterized in that with the estimated remaining operating time taken to be as the operating state of the radio communication device, the radio communication device sets the delay amount smaller when the estimated value of operating time is larger. Accordingly, the radio communication device whose operating time is longer performs the response or relay processing earlier. Therefore, a route selected giving preference to radio communication devices whose operating time is longer can be obtained without exchanging information of the operation time of the respective radio communication devices among themselves, and as a result, valid time of the route during which the route can be used can be longer than a conventional method in which the route of the shortest hop count is searched.

The route discovery method of the invention further includes a step in which the radio communication device monitors its battery remaining power and a step in which the radio communication device calculates the number of transmittable bits from the battery remaining power, and is characterized in that with the number of transmittable bits of the radio communication device taken to be as the operating state, the radio communication device sets the delay amount smaller when the number of transmittable bits is larger. Accordingly, the radio communication device having the larger number of transmittable bits transmitted with the actual battery remaining power performs the response or relay processing earlier. Therefore, a route selected giving preference to radio communication devices which can transmit larger data can be obtained without exchanging information of the transmittable number of bits of the radio communication device among respective radio communication devices, and as a result, the data transmittable in the selected route can be larger than that selected by a conventional method in which the route of the shortest hop count is searched.

The route discovery method of the invention further includes a step in which the radio communication device monitors its CPU usage state, and is characterized in that with the CPU usage state of the radio communication device taken to be its operating state, the radio communication device sets the delay amount smaller when a CPU usage rate is smaller. Accordingly, the radio communication device having a low processing load performs the response or relay processing earlier. Therefore, a route selected giving preference to radio communication devices whose processing load is low can be obtained, and as a result, the processing load of the respective radio communication devices can be leveled without exchanging the load information of the radio communication device among respective radio communication devices.

In the route discovery method of the invention, when the radio communication device itself is the source and transmits a data packet, or when it forwards a data packet from another radio communication device, a further step is included in which the radio communication device identifies the flow type of the data packet, a step in which the radio communication device stores transmission data and forwarding data in predetermined storage areas provided according to the flow type, a step in which the radio communication device identifies the flow type of data transmitted from the source of the route request message after the source of the route request message acquired route information, a step in which the radio communication device examines available capacity of the storage area corresponding to the flow type of the route request message transmitted from the source of the route request message, and a step in which the radio communication device decides whether the available capacity of the storage area corresponding to the flow type of data transmitted by the source of the route request message after the source acquires route information is more than a predetermined value or not in the step in which the radio communication device decides the delay amount, and is characterized in that when the available capacity is more than the predetermined value, the available capacity is taken to be the operating state of the radio communication device and the radio communication device sets the delay amount smaller when the available capacity is larger. Accordingly, the radio communication device sets the allowable processing load depending on the flow type to be relayed, and among the radio communication devices, that which has the better operating state performs the relay processing of the route request message earlier, and therefore, a route selected giving preference to radio communication devices having the better operating state can be obtained. It is not required that an alternative radio communication device existing in the neighborhood be selected by broadcasting the same route request message, therefore, a route suitable for the flow type can be obtained without increasing the frequency of transmission of the route request messages.

The route discovery method of the invention further includes a step in which the radio communication device manages information of neighboring radio communication devices with which the radio communication device can directly communicate by receiving, recording and updating the information, and is characterized in that with the total number of neighboring radio communication devices with which the radio communication device can directly communicate taken to be as the operating state of the radio communication device, the radio communication device sets the delay amount smaller when the total number of neighboring radio communication devices is small. Accordingly, the radio communication device having fewer neighboring radio communication devices performs the response or relay processing earlier, and therefore a route selected giving preference to radio communication devices having fewer neighboring radio communication devices can be obtained and the load of respective radio communication devices can be leveled without exchanging information of the other radio communication devices located in the neighborhood of a radio communication device among respective radio communication devices.

The route discovery method of the invention further includes a step in which the radio communication device manages route information to an arbitrary destination by recording and updating the information with transmission and reception of the route request message, the route reply message, and data, and is characterized in that with information of the number of valid entries of routes taken to be the operating state of the radio communication device, the radio communication device sets the delay amount smaller when the number of valid entries is smaller. Accordingly, the radio communication device having less route information for actually performing forwarding processing performs the response or relay processing earlier, and therefore, a route selected giving preference to radio communication devices performing few forwarding processing operations can be obtained without exchanging information of the number of valid routes possessed by the radio communication device among respective radio communication devices, and as a result, the load of respective radio communication devices can be leveled.

A route discovery method of the invention includes at least two among the following steps: a step in which the radio communication device monitors its battery remaining power, a step in which the radio communication device monitors its CPU usage state, a step in which the radio communication device monitors the available capacity of the area in which data of the flow type transmitted from the source of the route request message is stored after the source of the route request message has obtained route information, a step in which the radio communication device manages information of neighboring radio communication devices with which the radio communication device can directly communicate, and a step in which the radio communication device manages route information on the routes to the desired destination by updating the information according to transmission and reception of the route request message, the route reply message, and data, and is characterized in that the radio communication device sets the delay amount by combining at least two of the following: the battery remaining power, the CPU usage state, the available capacity, the total number of neighboring radio communication devices, and information of the number of valid entries of routes, in the step of deciding the delay amount. Accordingly, the condition setting becomes possible by the combination of these operating states to which appropriate weighting is performed, and therefore the radio communication device as the source of the route request message can obtain a route selected giving preference to radio communication devices having the optimum operating state for the communication conditions.

The route discovery method of the invention further includes a step in which the radio communication device stores in the route request message an identifier which identifies the operating state referred to for deciding the delay amount and a step in which the radio communication device identifies the identifier which identifies the operating state for deciding the delay amount, which is stored in the received route request message, and is characterized in that the radio communication device decides the delay amount using the operating state according to information of the operating state designated by the identifier which designates the operating state. According to this, the operating state referred to for searching the optimum route by the radio communication device can be decided flexibly according to communication data or surrounding environment, regardless of whether there is a communication session underway between devices or not, and the optimum route can be obtained based on the status of use.

The route discovery method of the invention further includes a step in which the radio communication device prohibits response transmission or relay forwarding in response to the received route request message when the operating state does not satisfy a specific condition and a step in which the radio communication device allows response transmission or relay forwarding in response to the route request message only when the device is in a better state than a specified standard. Accordingly, a radio communication device which does not surpass a specified standard can be prevented from taking charge of the relay of data communication of another radio communication device, and the stability of a communication route can be maintained because a radio communication device whose operating state is bad is not chosen as the relay station. Further, the deterioration of the operating state of the radio communication device itself can be prevented.

The route discovery method of the invention further includes a step in which a user of the radio communication device performs input for setting a mode which prohibits response transmission or relay forwarding in response to the route request message, or a mode which allows them. Accordingly, the user of the radio communication device can decide whether the radio communication device can operate as the relay station or not regardless of the operating state of the radio communication device.

The route discovery method of the invention further includes, in the step of deciding the delay amount, a step in which the radio communication device makes all frames in a radio link receivable when measurement of the delay amount is started, a step after all measurement of the delay amount has been completed in which the radio communication device switches to a mode in which in the radio link the device only receives a frame addressed to itself, a broadcast frame or a limited broadcast frame which must be received by itself, and a step before the measurement of the delay amount is completed in which the radio communication device stops the measurement of the delay amount for the corresponding route request message if the radio communication device detects a route reply message with respect to the received route request message, and stops response transmission or relay forwarding in response to the route request message. Accordingly, before the radio communication device in question relays the route request message or transmits a route reply message with respect to a received route request message, a route reply message to another radio communication device which is different from the radio communication device in question can be captured from another radio communication device located in the neighborhood, as a result, the acquisition of a route which is better than the route passing through the radio communication device in question can be detected, and therefore battery consumption and the use of radio resources for transmission of an unnecessary route request message and route reply message can be avoided by stopping relay forwarding of the route request message or transmission of the route reply message.

The route discovery method of the invention further includes a step in which the radio communication device records the route request message transmitted or relay-forwarded from neighboring radio communication devices, a step in which the radio communication device judges whether the route request message for which the delay amount is currently being measured has been transmitted or relay-forwarded from all neighboring radio communication devices or not and a step in which the radio communication device stops the measurement of the delay amount when it judges that the message has been transmitted or relay-forwarded from all neighboring radio communication devices, and stops response transmission or relay forwarding with regard to the route request message. Accordingly, if the radio communication device, before performing relay forwarding of the route request message with respect to the received route request message, detects that transmission or relay forwarding of the corresponding route request message has been performed from all radio communication devices located in the neighborhood, and thus the route request message to be transmitted by the radio communication device itself will be disposed of in neighboring radio communication devices, transmission of the unnecessary route request message can be prevented by stopping relay forwarding of the route request message, thus avoiding unnecessary battery consumption and use of radio resources.

A radio communication device in question of the invention in a network in which data can be forwarded by multistage relays between plural radio communication devices which when it requires route information to a radio communication device which is the destination of data transmission, transmits a route request message to the destination in the network and receives a route reply message regarding the route request message and so acquires route information, includes a route control message processing unit judging whether the received route request message is addressed to itself or not, a route request message management unit having a function of deciding a delay amount for delaying performance of response transmission or relay forwarding with respect to a received route request message based on its operating state when the route control message processing unit judges that the route request message is not addressed to itself, and a delay processing unit having a function of running a timer for the delay amount and judging whether the delay time amount has passed or not, performing response transmission or relay forwarding with respect to the route request message when the delay amount has passed. According to the configuration, the radio communication device having the better operating state among the radio communication devices performs relay processing of the route request message or transmission processing of the route reply message earlier, and therefore a route selected giving preference to radio communication devices having the better operating state can be obtained without exchanging operating state information of the radio communication devices among the respective radio communication devices.

The radio communication device of the invention further includes a remaining battery capacity monitor unit having a function of monitoring its battery remaining power, and is characterized in that the route request message management unit takes the battery remaining power to be the operating state of the radio communication device, and sets the delay amount to be smaller, when the battery remaining power is larger, when the estimated operating time calculated based on the battery remaining power is larger, or when the transmittable number of transmittable bits calculated based on the battery remaining power is larger. According to the configuration, the radio communication device whose battery remaining power is larger performs the response or relay processing earlier. Therefore, a route selected giving preference to radio communication devices whose battery remaining power is larger can be obtained without exchanging information of the battery remaining power of the radio communication devices among those radio communication devices, and the time the route can be used is made longer than in the conventional method in which the route of the shortest hop count is searched.

The radio communication device of the invention further includes a processing load monitor unit having a function of monitoring the CPU usage state of the radio communication device, and is characterized in that the route request message management unit takes the CPU usage state to be the operating state of the radio communication device and sets the delay amount to be smaller when the CPU usage rate is smaller. According to this configuration, the radio communication device whose processing load is lower performs the response and relay processing earlier. Therefore, a route selected giving preference to radio communication devices whose processing load is low can be obtained without exchanging information of the load of the radio communication devices among those radio communication devices, and as a result, the processing loads of the radio communication devices can be leveled.

The radio communication device of the invention further includes a flow identification processing unit having a function of identifying the flow type of a data packet when the radio communication device itself is the source transmitting a data packet, or when the radio communication device forwards a data packet from another radio communication device, a buffer management unit having a function of storing data for transmission or forwarding whose flow types are specified by the flow identification processing unit, in predetermined storage areas provided according to the flow type and examining available capacities of respective storage areas, and a route request message management unit further having a function of judging the flow type of data transmitted from the source of the route request message based on the received route request message, and is characterized in that the route request message management unit takes the available capacity to be the operating state of the radio communication device when the available capacity of the storage area for the flow type of data transmitted from the source of the route request message is more than a prescribed value, and sets the delay amount to be smaller when the available capacity is larger. According to the configuration, radio communication devices are realized in which the allowable processing load is determined according to the flow type to be relayed and that device which has the better operating state among them performs the relay processing of the route request message earlier, and therefore a route selected giving preference to radio communication devices having the better operating state can be obtained. It is not required that an alternative radio communication device existing in the neighborhood is selected by broadcasting the route request message, therefore, a route suitable for the flow type can be obtained without increasing the frequency of transmission of the route request message.

The radio communication device of the invention further includes a neighborhood table management unit having a function of managing information concerning neighboring radio communication devices with which the radio communication device can directly communicate, recording and updating this information, and is characterized in that the route request message management unit takes the total number of neighboring radio communication devices with which the radio communication device can directly communicate to be the operating state of the radio communication device and sets the delay amount to be smaller when the total number of neighboring radio communication devices is fewer. According to the configuration, the radio communication device having fewer neighboring radio communication devices performs the response or relay processing earlier, and therefore a route selected giving preference to radio communication devices having fewer neighboring radio communication devices can be obtained without exchanging information on the radio communication devices located in the neighborhood of the radio communication device among those radio communication devices, and as a result, the loads of the respective radio communication devices can be leveled.

The radio communication device of the invention includes a route recording unit having a function of setting validity or invalidity of route information on routes to an arbitrary destination and a route information recording unit having a function of recording information of the number of valid entries of route, and is characterized in that the route request message management unit takes information of the number of valid entries of route to be the operating state of the radio communication device and sets the delay amount to be smaller when the number of valid entries is smaller. According to the configuration, the radio communication device having less route information on fewer routes for actually performing forwarding processing performs the response or relay processing earlier, therefore, a route selected giving preference to radio communication devices having less forwarding processing work can be obtained without exchanging information of the number of valid routes possessed by the respective radio communication devices among those radio communication devices, and as a result, the loads of the radio communication devices can be leveled.

The radio communication device of the invention includes at least two among the following units: a remaining battery capacity monitor unit having the function of monitoring the battery remaining power of the radio communication device, a processing load monitor unit having the function of monitoring the CPU usage state of the radio communication device, a buffer management unit for monitoring the available capacity of the memory area in which the data flow type which was transmitted from the source of the route request message is stored, after the source of the route request message acquires route information, a neighborhood table management unit having the function of managing information of neighboring radio communication devices with which the radio communication device can directly communicate, and a route information recording unit having the function of recording the information of the number of valid route entries, and is characterized in that the route request message management unit sets the delay amount by combining at least two of the following characteristics: the battery remaining power, the CPU usage state, the available memory capacity, the total number of neighboring radio communication devices and the information of the number of valid route entries. According to the configuration, the condition setting based on a combination of these operating states to which appropriate weighting is performed is possible, and therefore, the radio communication device which is the source of the route request message can obtain a route selected giving preference to radio communication devices having the optimum operating state with regard to the communication conditions.

The radio communication device of the invention further includes a mode selection unit having a function of prohibiting or allowing response transmission or relay forwarding in response to a received route request message, and is characterized in that the mode selection unit prohibits response transmission and relay forwarding in response to the route request message when the operating state is not better than a specific condition, and allows response transmission and relay forwarding in response to the route request message only when the operating state is better than the specific condition. According to the configuration, a radio communication device whose operating state is not better than the specific condition is prevented from taking charge of the relay of data communication of another radio communication device, and so deterioration of the stability of the communication route due to selecting a radio communication device whose operating state is worse as the relay station is avoided. Further, the deterioration of operating state of the radio communication device itself can be prevented.

The radio communication device of the invention further includes a mode selection unit further having a function of selecting and inputting the prohibition or allowance of response transmission or relay forwarding in response to the received route request message and a display unit for displaying whether the operating mode is the prohibition or the allowance of response transmission or relay forwarding in response to the currently received route request message. According to the configuration, a user can set and verify the relay mode of the radio communication device which is used.

The radio communication device of the invention further includes a receiving mode setting unit having a function of setting a data link control unit so that all frames can be received in a radio link, and is characterized in that the receiving mode setting unit sets the receiving operation mode to an all-frame receivable mode when the delay processing unit starts measurement of the delay amount, instructs the delay processing unit to stop measurement when the route control message processing unit detects a route reply message with respect to the received route request message before the measurement of the delay amount is finished, and sets the data link control unit to a normal frame receiving mode in which only a frame addressed to itself, a broadcast frame and a limited broadcast frame which must be received by itself are received in the radio link, when all measurements of the delay amount have been completed. According to the configuration, before the radio communication device in question relays the route request message or transmits the route reply message with respect to the received route request message, the route reply message addressed to another radio communication device which is located in the neighborhood and is different from the radio communication device in question can be captured from the other radio communication device, and as a result, the acquisition of a route which is better than the route passing through the radio communication device in question can be detected, and therefore transmission of unnecessary route control messages can be avoided by stopping relay forwarding of the route request message or transmission of the route reply message, thus preventing battery consumption and the use of radio resources.

The radio communication device of the invention further includes a neighborhood relay table having a function of managing the route request messages transmitted or relay-forwarded from neighboring radio communication devices, characterized in that while the delay amount is being measured, whether the route request message which is to be delayed by the delay amount has been transmitted or relay-forwarded from all neighboring radio communication devices or not is determined, and the delay processing unit is instructed to stop the measurement when it judges that the message has been transmitted or relay-forwarded from all neighboring radio communication devices. According to this configuration, if the radio communication device in question, before performing relay forwarding of the route request message with respect to the route request message received by the radio communication device, detects that transmission or relay forwarding of the corresponding route request message has been performed from all radio communication devices located in the neighborhood, and therefore, the route request message to be relay-forwarded by the radio communication device in question has been disposed of by neighboring radio communication devices, battery consumption and the use of radio resources owing to transmission of unnecessary route request messages can be avoided by stopping relay forwarding of the route request message.

As described above, according to the invention, the route to the destination can be selected giving preference to battery remaining power of the radio communication device without putting information of the battery remaining power in the route request message, and thus without increasing overhead of the route request message by the source radio communication device. Accordingly, the time that the acquired route can be used can be made long. The appropriate route can be selected in advance giving importance to relay load or the flow type of data without exchanging information of the relay load or searching anew for a route whose load is low among the radio communication devices. Therefore, the use of radio resources can be suppressed and the loads of the radio communication devices can be leveled.

BRIEF DESCRIPTION OF THE DRAWINGS

FIG. 5 is a table showing a format of the route request message according to the embodiment 1 of the invention.

FIG. 6 is a table showing a format of the route reply message according to the embodiment 1 of the invention.

FIG. 8 is a table showing an example of battery remaining power of respective radio communication devices in the ad hoc network according to the embodiment 1 of the invention.

FIG. 10 is a table showing an example of route information recorded in a route recording unit according to the embodiment 1 of the invention.

FIG. 11 is a table showing an example of a route request message table managed at a route request message management unit according to the embodiment 1 of the invention.

FIG. 13 is a table showing an example of a route request message table managed at a route request message management unit according to the embodiment 2 of the invention.

FIG. 14 is an example of a neighborhood relay table according to the embodiment 2 of the invention.

FIG. 18 is an example of a neighborhood table according to the embodiment 3 of the invention.

FIG. 21 is table showing an example of route information in a route information recording unit according to the embodiment 4 of the invention.

FIG. 23 is a table showing an example of a delay amount decision table according to the embodiment 5 of the invention.

FIG. 26 is a table showing a format of a route request message according to the embodiment 6 of the invention.

Figure 1:
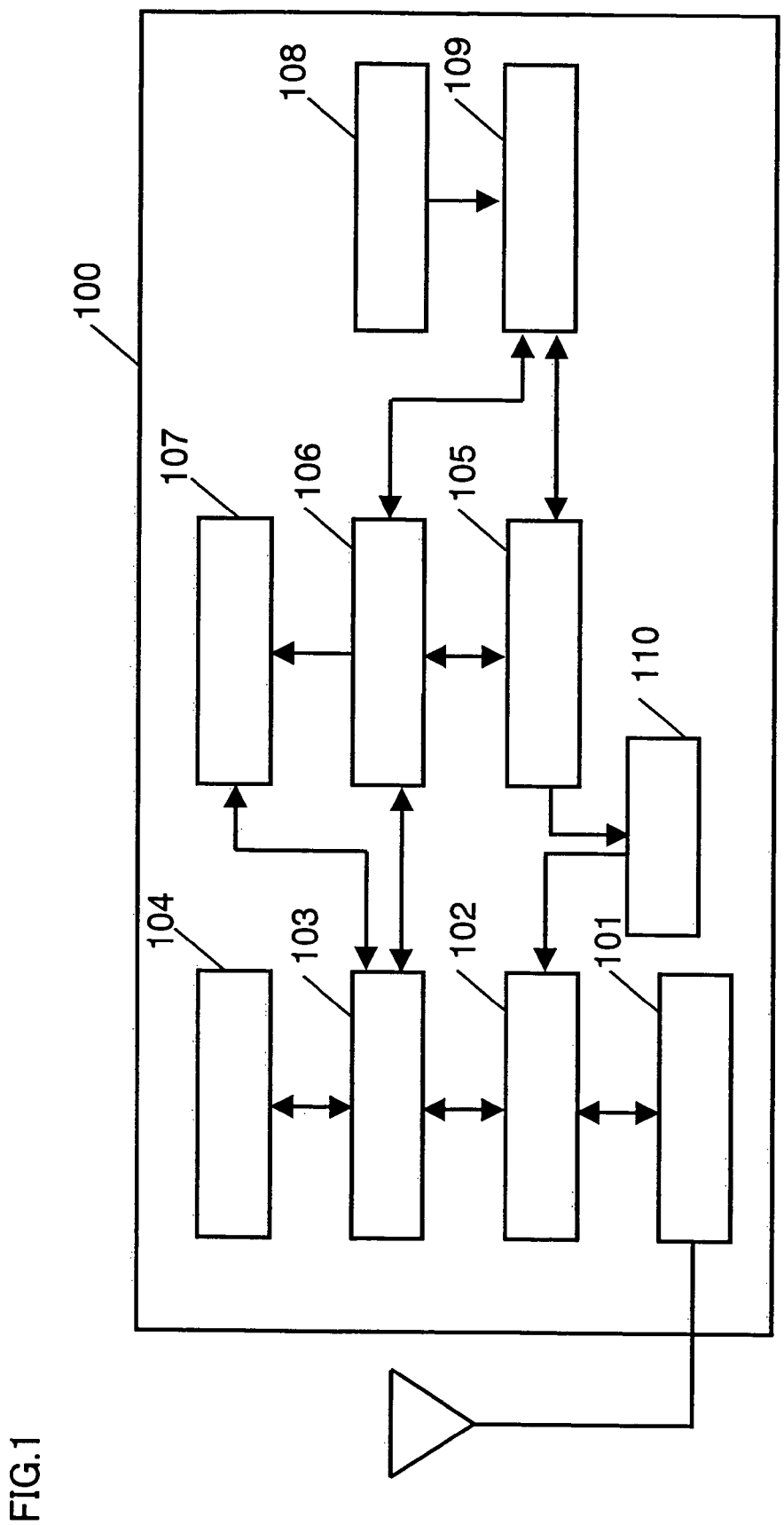
FIG. 1 is a diagram showing a configuration of a radio communication device according to an embodiment 1 of the invention.

DESCRIPTION OF REFERENCE NUMERALS 100, 1200, 1700, 2000, 2200 radio communication device
101 radio interface
102, 2401 data link control unit
103, 1703, 2402 network controller
104 upper layer processing unit
105 delay processing unit
106, 2403 route control message processing unit
107, 2001 route recording unit
108 remaining battery capacity monitor unit
109, 1201, 1702, 2002, 2201, 2409 route request message management unit
110 receiving mode setting unit
701 to 708 radio communication device
710 communication link
1202 neighborhood relay table
1701 neighborhood table management unit
2003 route information number management unit
2404 flow identification processing unit
2405 buffer management unit
3001 mode selection unit
3002 display unit

BEST MODE FOR CARRYING OUT THE INVENTION

Hereinafter, embodiments of the invention will be explained with reference to the drawings.

Embodiment 1

FIG. 1 to FIG. 10 show one embodiment of a radio communication device and a route discovery method according to an embodiment 1 of the invention.

FIG. 1 is a block diagram showing a configuration of a radio communication device of the invention. A radio interface 101 includes an antenna, an RF circuit and a baseband processing circuit, which executes processing of modulating a signal received from a data link control unit 102, converting it into a radio signal and transmitting the signal from an antenna, and a processing of demodulating the radio signal from the antenna and giving the digital signal to the data link control unit 102.

In the data link control unit 102, framing a signal obtained from a network controller 103 in a format prescribed by a designated data link layer, giving the signal to the radio interface 101, removing data link layer header/tailer from the digital signal received from the radio interface 101, giving the signal to the network controller 103, and acquiring authority to access a radio media in accordance with an access system prescribed by the data link layer are carried out.

A receiving mode setting unit 110 sets a receiving mode in the data link control unit 102 to be an all frame receiving mode (hereinafter, referred to as a promiscuous mode) or a normal frame receiving mode (a state not set to the promiscuous mode). In the case that the receiving mode is set to the promiscuous mode, the data link control unit 102 analyzes a frame even when the receiving frame is not a broadcast frame, an unicast frame addressed to itself, or a limited broadcast frame to be received by itself, and when the frame is received correctly, the unit removes the frame header to make it a packet and gives it to the network controller 103.

In the case of the normal frame receiving mode, the data link control unit 102 analyses only the broadcast frame, the unicast frame addressed to that radio communication device and the limited broadcast frame which must be received by that radio communication device, and when the frame is received correctly, the unit removes a frame header to make it a packet and gives it to the network controller 103.

The radio interface 101 and the data link control unit 102 are prescribed by, for example, IEEE 802.11a, IEEE 802.11b, IEEE 802.11e, Bluetooth (registered trademark), UWB or the like.

The network controller 103 performs a processing of adding an IP header to a message received from an upper layer, determining the next transmission destination on the route to the destination address, based on information of a route recording unit 107, and giving it to the data link control unit 102. At this time, when the next transmission destination on the rout to the destination address is not recorded, the network controller 103 notifies and requests a route control message processing unit 106 to make a route request message.

The network controller 103 decides upon giving the packet received from the data link control unit 102 to an upper layer processing unit 104, relaying the packet to another radio communication device, or giving the packet to the route control message processing unit 106, and performs this processing. When the destination of the packet is that radio communication device or when the packet is broadcast, and the route request message and the route reply message are included in the packet, these messages are extracted and given to the route control message processing unit 106. When the destination of the packet is that radio communication device and the message of the upper layer is included, the message is given to the upper layer processing unit 104. When the destination of the packet is not that radio communication device, the forwarding destination is decided based on information of the route recording unit 107, and the packet is given to the data link control unit 102 by revising a packet header if necessary. The network controller 107 adds a packet header indicating that the transmission source is that radio communication device and that the message is to be broadcast to the route request message to be transmitted which is received from the route control message processing unit 106, and gives the message to the data link control unit 102, and adds to the route reply message to be transmitted which is received from the route control message processing unit 106 a packet header indicating that the transmission source is that radio communication device and that the destination is a radio communication device of the next hop of the source radio communication device in the route reply message recorded in the route recording unit 107, and gives the message to the data link control unit 102. The upper layer processing unit 104 performs layer processing of layers no lower than the network layer, giving and receiving data to and from the network controller 103 if necessary.

A delay processing unit 105 starts a relay of the route request message or a relay processing of transmission of the route reply message upon receiving a delay processing start notification from the route control message processing unit 106. The delay amount delaying the relay forwarding processing is decided by a value of a route request message table in a route request message management unit 109. When the delay processing is started, the receiving mode setting unit 110 is instructed to establish the promiscuous mode and the receiving mode setting unit 110 sets the data link control unit 102 to be the promiscuous mode. According to this, route reply messages transmitted by unicasting by other radio communication devices can be received. When the delay processing started upon receiving one route request message is completed, a timer valid flag for the source radio communication device identifier, destination radio communication device identifier, and route request message identifier indicated in the route request message table is made to be invalid. Further, when all delay processing is completed, the receiving mode setting unit 110 is instructed to cancel the promiscuous mode setting, and the receiving mode setting unit 110 cancels the promiscuous mode setting of the data link control unit 102.

The route control message processing unit 106 performs transmission and reception of the route request message and the route reply message. When instructed from the network controller 103, the route control message processing unit 106 generates the route request message and performs transmission, and records required information in the route request message management unit 109. Upon receiving the route request message or the route reply message, information update of the route request message management unit 109 or the route recording unit 107, and a delay processing notification and a timer period completion notification to the delay processing unit are performed.

The route recording unit 107 receives and records the destination radio communication device identifier, the next hop radio communication device identifier and a destination radio communication device sequence number based on the route request message and the route reply message processed in the route control message processing unit 106. FIG. 10 shows an example of route information recorded in the route recording unit 107. A radio communication device having the route information shown in FIG. 10 has an entry in which the forwarding destination of a packet addressed to a radio communication device having the destination identifier "G" is a radio communication device having the next hop identifier "D", the sequence number is 20 and the hop count to the radio communication device having the destination identifier "G" is 3. In the same way, the radio communication device has an entry in which the forwarding destination of a packet addressed to a radio communication device having the destination identifier "F" is a radio communication device having the next hop identifier "D", the sequence number is 2 and the hop count to the radio communication device having the destination identifier "F" is 2. Further, in the same way, the radio communication device has an entry in which the forwarding destination of a packet addressed to a radio communication device having the destination identifier "E" is a radio communication device having the next hop identifier "B", the sequence number is 4 and the hop count to the radio communication device having the destination identifier "E" is 3. When the packet is given from the network controller 103 to the data link control unit 102, the forwarding destination is decided based on information of the route recording unit 107.

Further, if the route request message and the route reply message are passed from the route control message processing unit 106 to the network controller 103, the forwarding destination is decided and a packet header is added based on information of the route recording unit 107.

A remaining battery capacity monitor unit 108 performs a processing of monitoring a battery remaining power of the radio communication device. For example, an actual measured value of the battery remaining power, ratio of the battery remaining power to that when full, or a level of battery remaining power obtained by dividing the battery remaining power into 3 levels of High, Middle and Low with regard to full capacity is given to the route request message management unit 109.

The route request message management unit 109 includes the route request message table in which respective radio communication device identifiers, route request message identifiers, timer valid flags and timer values are recorded for reading a route request message from an arbitrary source to an arbitrary destination. When a new route request message is received and an entry is recorded in the route request message table, the timer value is set depending on the battery remaining power level from the remaining battery capacity monitor unit 108 and the flag is made to be valid. In the case that the timer period completion notification is given from the route control message processing unit 106 or the set timer period has completed, the valid flag is set to be invalid. Further, in the case that the flag keeps the invalid state for a fixed period (route request message keeping period) after the setting to invalid, the entry is deleted.

FIG. 11 shows an example of the route request message table managed in the route request message management unit 109. A radio communication device having the route request message table shown in FIG. 11 has an entry in which the route request message (the route request message identifier is 3) requesting a route from a radio communication device having a source identifier "B" to a radio communication device having a destination identifier "H" is received, and a delay processing clocking the passage of required delay time of 10 ms for relay forwarding of the route request message (or transmission of the route reply message) is performed. In the same way, the device has an entry in which the route request message (the route request message identifier is 2) requesting a route from the radio communication device having the source identifier "B" to a radio communication device having the destination identifier "E" is received, and the delay processing delaying relay forwarding of the route request message (or transmission of the route reply message) is not done. Further, in the same way, the device has an entry in which the route request message (the route request message identifier is 17) requesting a route from a radio communication device having the source identifier "F" to a radio communication device having the destination identifier "G" is received, and the delay processing clocking the passage of required delay time of 14 ms for relay forwarding of the route request message (or transmission of the route reply message) is performed.

Calculation of the delay amount performed by the route request message management unit 109 will now be explained.

The route request message management unit 109 sets a maximum time for waiting for the route information response and the number of hops allowed to support communication.

The route request message management unit 109 calculates the maximum value of the delay amount from the maximum waiting time for the route information response and the allowable hop count. Formula 1 below is an example of a calculation of the delay amount maximum value.

Delay amount maximum value=Maximum waiting time for route information response/(2×allowable hop count)      (formula 1)

In each radio communication device, the delay amount is decided based on the delay amount maximum value decided by formula 1 and depending on the operating state of the radio communication device.

When the delay amount is decided according to the battery remaining power, the remaining battery capacity monitor unit 108 calculates what % of full battery capacity the battery remaining power of the radio communication device is. In the case that the calculated value is 60%, when the maximum waiting time for the route reply is 160 ms and the allowable hop count is 10 hops, a relay delay amount will be decided by the following formula.

(1−0.6)×160/(2×10)=3.2 ms

When the battery remaining power is divided into three stages, High, Middle and Low, the delay amount is also given three values, taking the maximum delay amount value as the highest value. Specifically, it will be {delay 0 mn, delay 4 mn, delay 8 ms}. For example, battery remaining power of 60% is the {Middle} level, and therefore the relay of the route request message will be performed after 4 ms.

Figure 2:
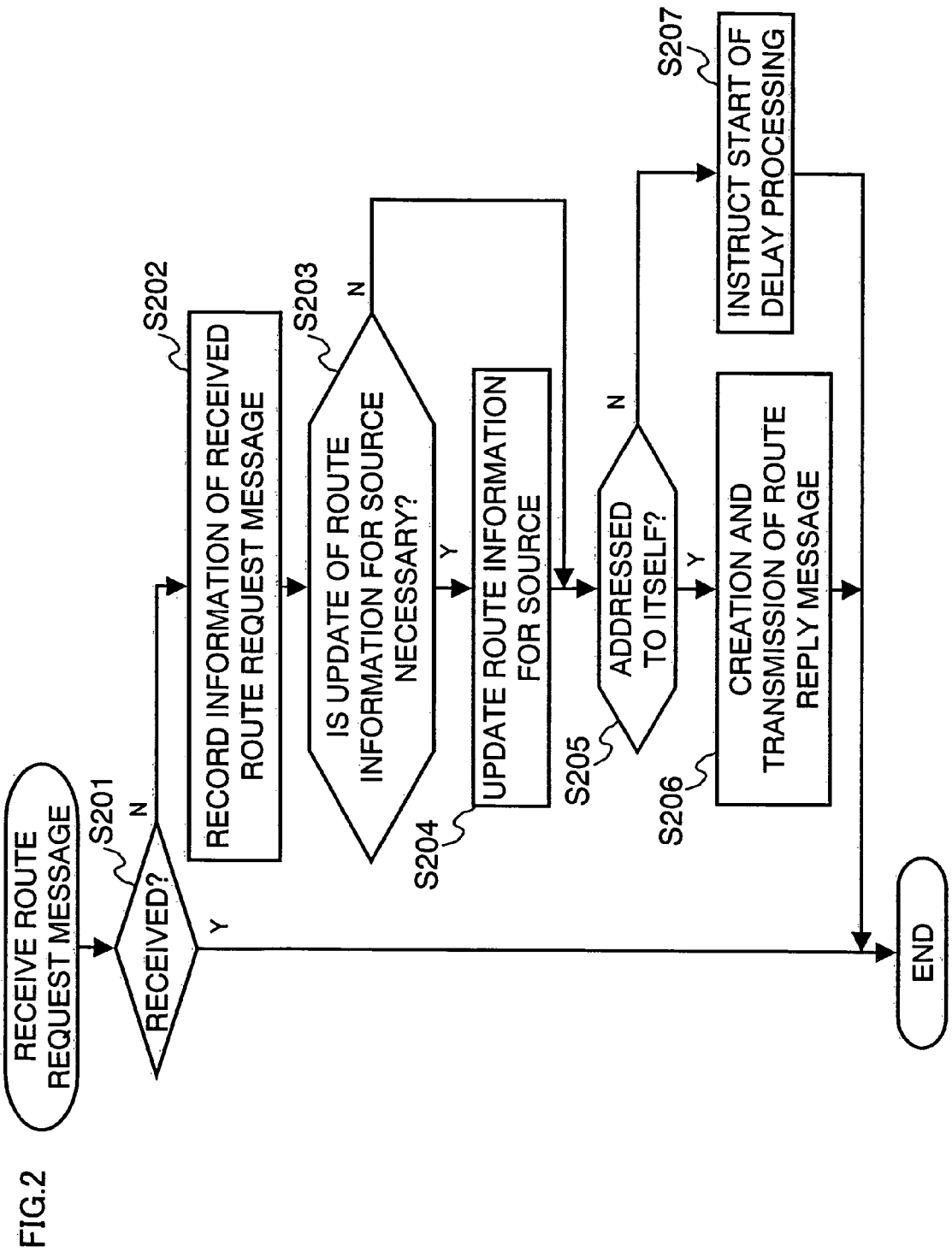
FIG. 2 is a chart showing a reception processing flow of a route request message according to the embodiment 1 of the invention.

FIG. 2 shows an example of reception processing flow for a route request message in each radio communication device. FIG. 5 shows an example of the route request message, using the route request message stipulated in the document "Ad Hoc On-Demand Distance-Vector Routing", cited as a conventional example. The route request message includes, as shown in FIG. 5, a source radio communication device identifier (source address) which identifies the source radio communication device of the route request message, a destination radio communication device identifier (destination address) which identifies the destination radio communication device and a route request message identifier by which a route request message is identified.

The radio communication device, when receiving the route request message, examines carefully whether the combination of {source identifier, destination identifier, route request message identifier} in the received message exists in the route request message table or not (step S201). When the judgment of the step S201 is "Yes", namely, when receiving a route request message for which reception processing has already been performed, neither relay processing nor response processing is performed. Therefore, either the relay processing or the response processing is performed for a route request message the first time one arrives. When the judgment in the step (step S201) is "No", the source identifier, destination identifier, and route request message identifier in the received route request message is recorded in the route request message table (step S202).

Next, whether route information for the source of the route request message should be updated or not is examined carefully (step S203). In step S204, when route information for the source does not exist in the route recording unit 107, it is recorded anew, and even when route information exists in the route recording unit 107, in the case that the source sequence number is newer than the value stored in the route recording unit 107, route information is updated (step S204). Forming (updating) route information is performed by recording the source radio communication device identifier in the received route request message, the adjacent radio communication device identifier from which the route request message was received, and the source radio communication device sequence number contained in the received route request message in the fields destination identifier, next hop identifier, and sequence number respectively.

When the judgment is "No" in the step S203, or after the processing of the step S204, the radio communication device judges whether it is the radio communication device from which the route is requested or not (step S205). When the judgment in the step S205 is "Yes", the radio communication device creates a route reply message and transmits the message to the transmission source after adding a packet header in which the destination is the radio communication device identifier of the next hop and the transmission source is the device itself based on route information to the source stored in the route recording unit 107 (step S206). When the judgment is "No" in the step S205, namely, when the radio communication device is not that from which the route is requested, the device makes the timer valid flag of the field of the combination of {source identifier, destination identifier, route request message identifier} in question recorded in the route request message table to be "valid", also sets the timer value and instructs the delay processing unit 105 to start the delay processing (step S207).

The value of timer is set based on the battery remaining power given by the remaining battery capacity monitor unit 108. The timer value is set, for example in the case that the battery remaining power is divided into 3 levels High, Middle, and Low and the timer shows the expiration of time after "0" seconds when the current amount is High, after T1 seconds when the amount is at the Middle level, and after T2 seconds when the amount is Low (here, T1<T2; for example, T1=10 ms, T2=20 ms). By setting an individual preference to each radio communication device and adding the preference value to the timer value to be set, simultaneous transmission by plural radio communication devices can be avoided.

Figure 3:
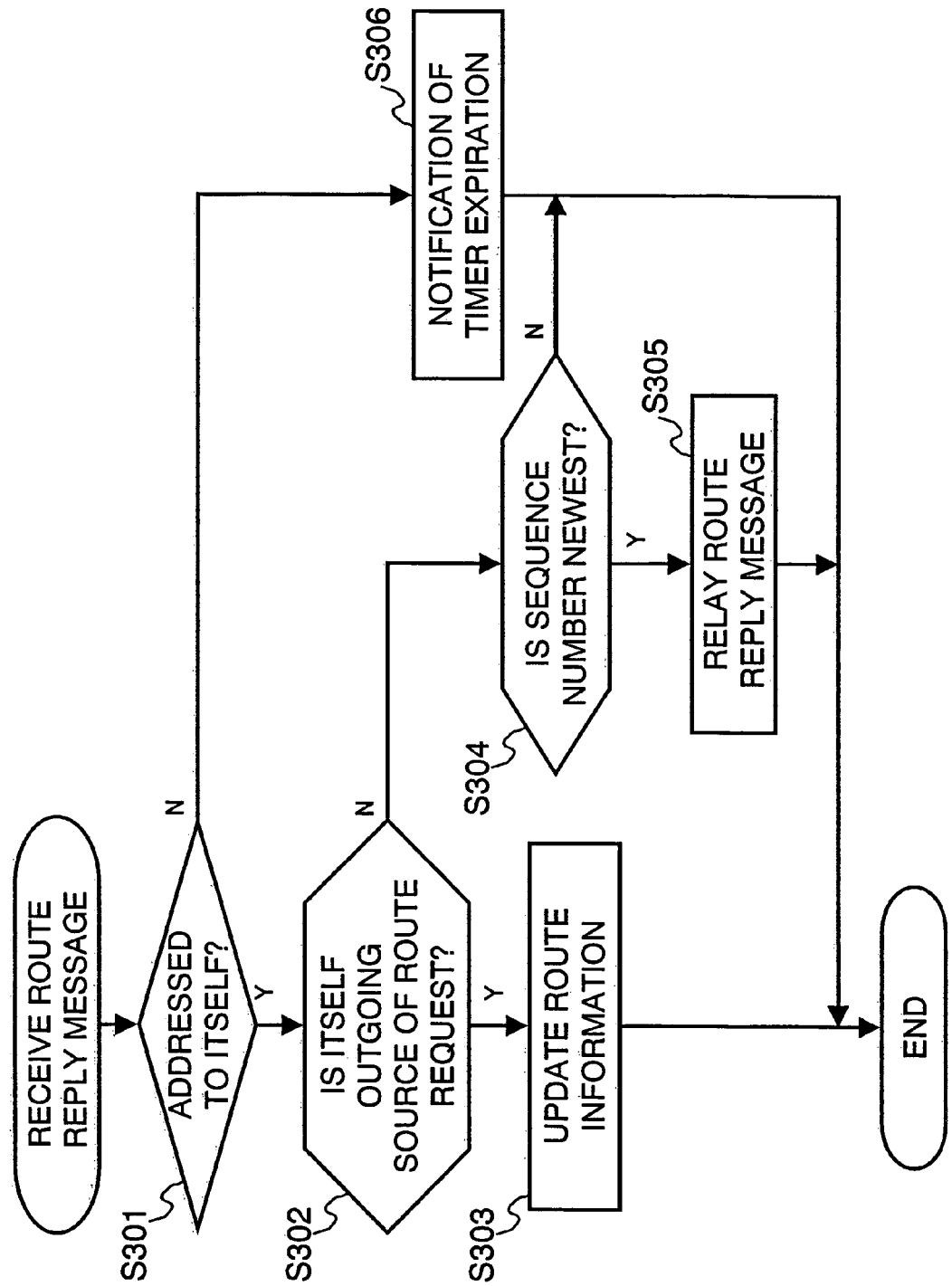
FIG. 3 is a chart showing a reception processing flow of a route reply message according to the embodiment 1 of the invention.

FIG. 3 shows an example of reception processing flow of the route reply message in each radio communication device. FIG. 6 shows an example of the route reply message, using the route reply message stipulated in the document "Ad Hoc On-Demand Distance-Vector Routing" cited as a conventional example.

When the radio communication device receives a route reply message, it judges whether the message is addressed to the device or not (step S301). When the judgment is "Yes" in the step S301, namely, when the message is addressed to itself, the radio communication device judges whether the message is a route reply message responding to a route request message whose source is the device itself or not (step S302). When the judgment is "Yes" in the step S302, the device updates route information based on information in the route reply message and the identifier of the neighboring radio communication device which has transmitted the message (step S303). The update of route information is performed by recording the destination radio communication device identifier contained in the received route reply message, the adjacent radio communication device identifier from which the received route reply message was received, and the destination radio communication device sequence number contained in the received route reply message in the fields of the destination identifier, next hop identifier, and sequence number respectively in the route recording unit 107.

When the judgment is "No" in the step S302, namely, when the radio communication device is not the source of the route request message to which the received route reply message is responding, the device compares the destination radio communication device sequence number in the received route reply message to the corresponding destination radio communication device sequence number recorded in its route recording unit 107. If the value in the received route reply message is newer, the route reply message is relayed to the transmission source (step S305).

When the judgment is "No" in the step S301, namely, when the route reply message is not addressed to the device, the route reply message containing the combination of source identifier and destination identifier transmitted by the neighboring radio communication device is received in the promiscuous mode. In order to finish the delay processing, the timer time completion notification is given to the delay processing unit 105 (step S306).

Figure 4:
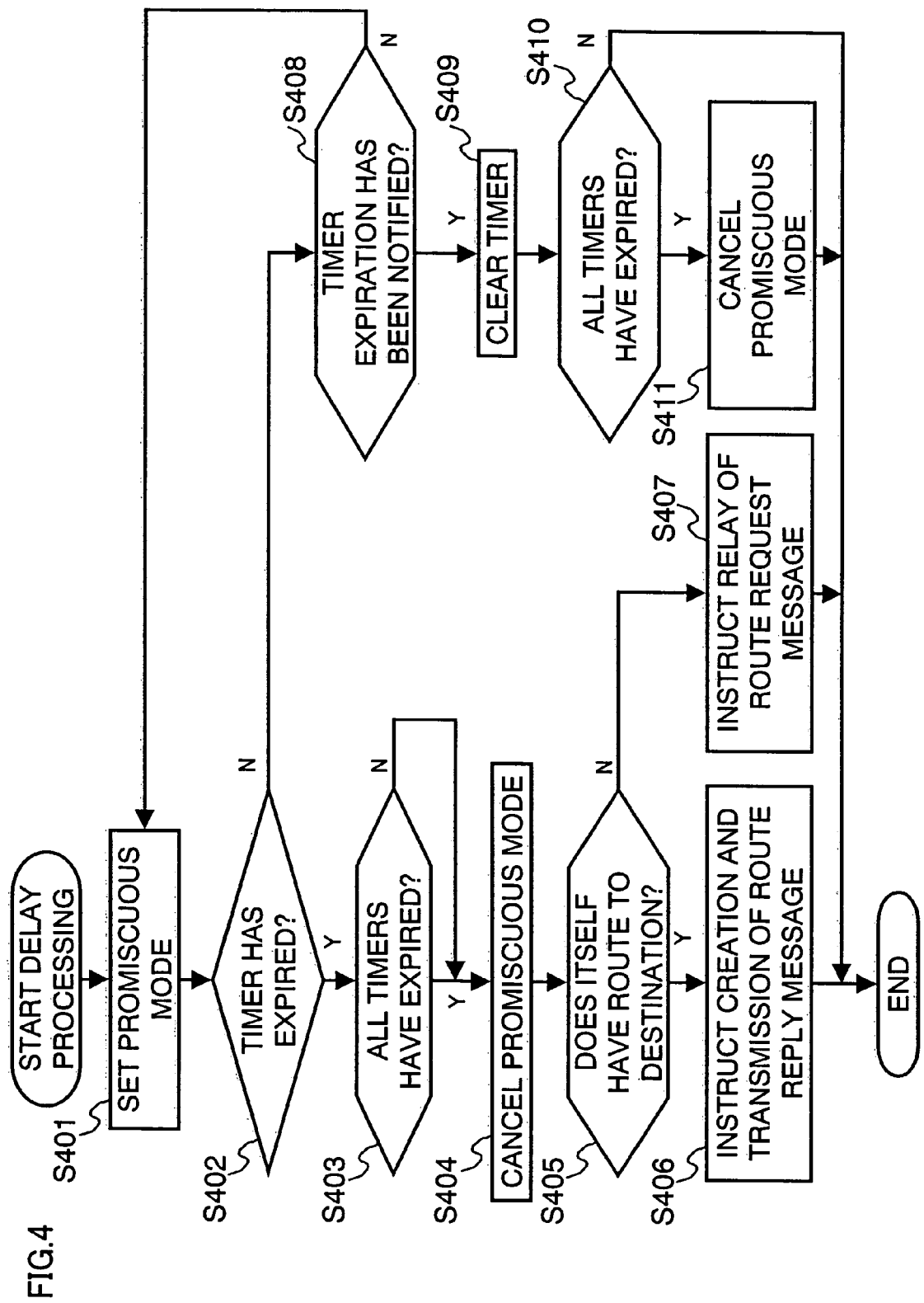
FIG. 4 is a chart showing a delay processing flow according to the embodiment 1 of the invention.

FIG. 4 shows delay processing when the delay processing start is instructed in the step (step S207) of the route request message receiving flow shown in FIG. 2, operating independent of the route request message and route reply message reception processings. By the step S207, when instructed by the delay processing unit 105 to set the timer for the combination of source identifier, destination identifier, and route request message identifier recorded in the route request message table (step S202), in the case that the data link control unit 102 is not set to the promiscuous mode, the receiving mode setting unit is instructed so that the data link control unit 102 is set to the promiscuous mode (step S401). Next, in step S402, it is judged whether the time measured by the timer of the above combination has expired. In the case that the time has expired, namely, when the judgment is "Yes" in the step S402, if times measured by all timers of other combinations have expired, the device notifies the receiving mode setting unit, and the receiving mode setting unit instructs the data link control unit 102 to cancel the promiscuous mode (step S404).

Further, it is judged whether the route to the destination indicated by the route request message of the above combination is included in the route recording unit 107 (step S405), when the judgment of step S405 is "Yes", the device instructs the route control message processing unit 106 to make and transmit the route reply message (step S406). When the judgment of step S405 is "No", the route control message processing unit 106 is instructed to broadcast the route request message (step S407).

When the judgment of the step S402 is "No", namely, when the time measured by the timer has not expired, the device waits until the time expires to do the processing. During this time, if a route reply message with the same combination of {source identifier, destination identifier, route request message identifier} as that for which the timer is activated is received, the expiration of time is notified (step S306 in FIG. 3), the step S408 is judged to be "Yes", timing of the corresponding timer is completed (step S409) and the delay processing for the above source identifier, destination identifier, and route request message identifier is finished without performing the relay processing of the route request message and transmission processing of the route reply message. At this time, when all timers of other combinations have expired, the promiscuous mode is cancelled (step S411).

Figure 7:
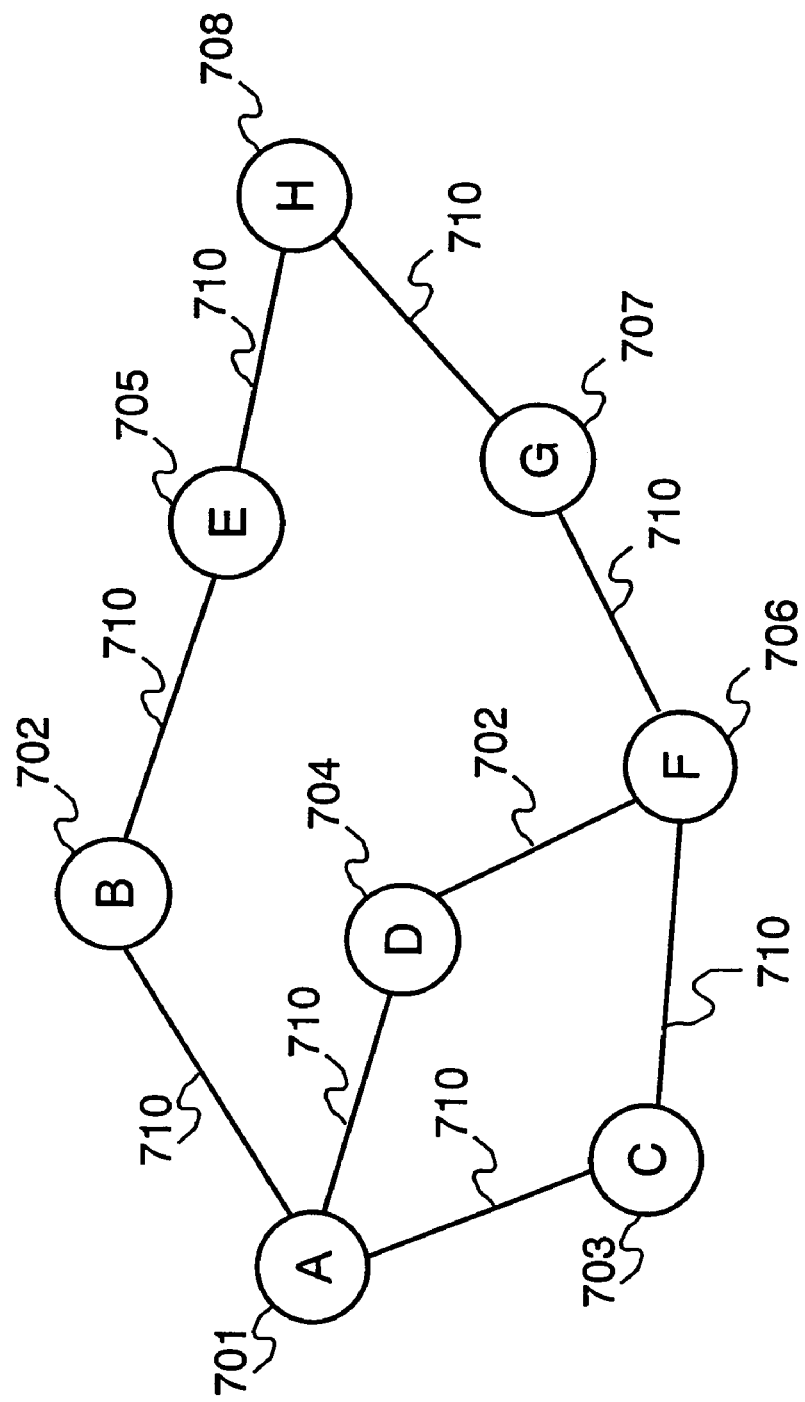
FIG. 7 is a diagram showing an example of an ad hoc network including radio communication devices according to the embodiment 1 of the invention.

FIG. 7 shows an example of an ad hoc network constituted by the radio communication devices as shown in FIG. 1. In FIG. 7, respective radio communication devices A (701) to H (708) are located in an area where they can communicate directly with each other by a link 710.

FIG. 8 shows an example of the battery remaining power of the radio communication devices B (702) to H (708). In this chart, the battery remaining power level is divided into three stages.

Figure 9:
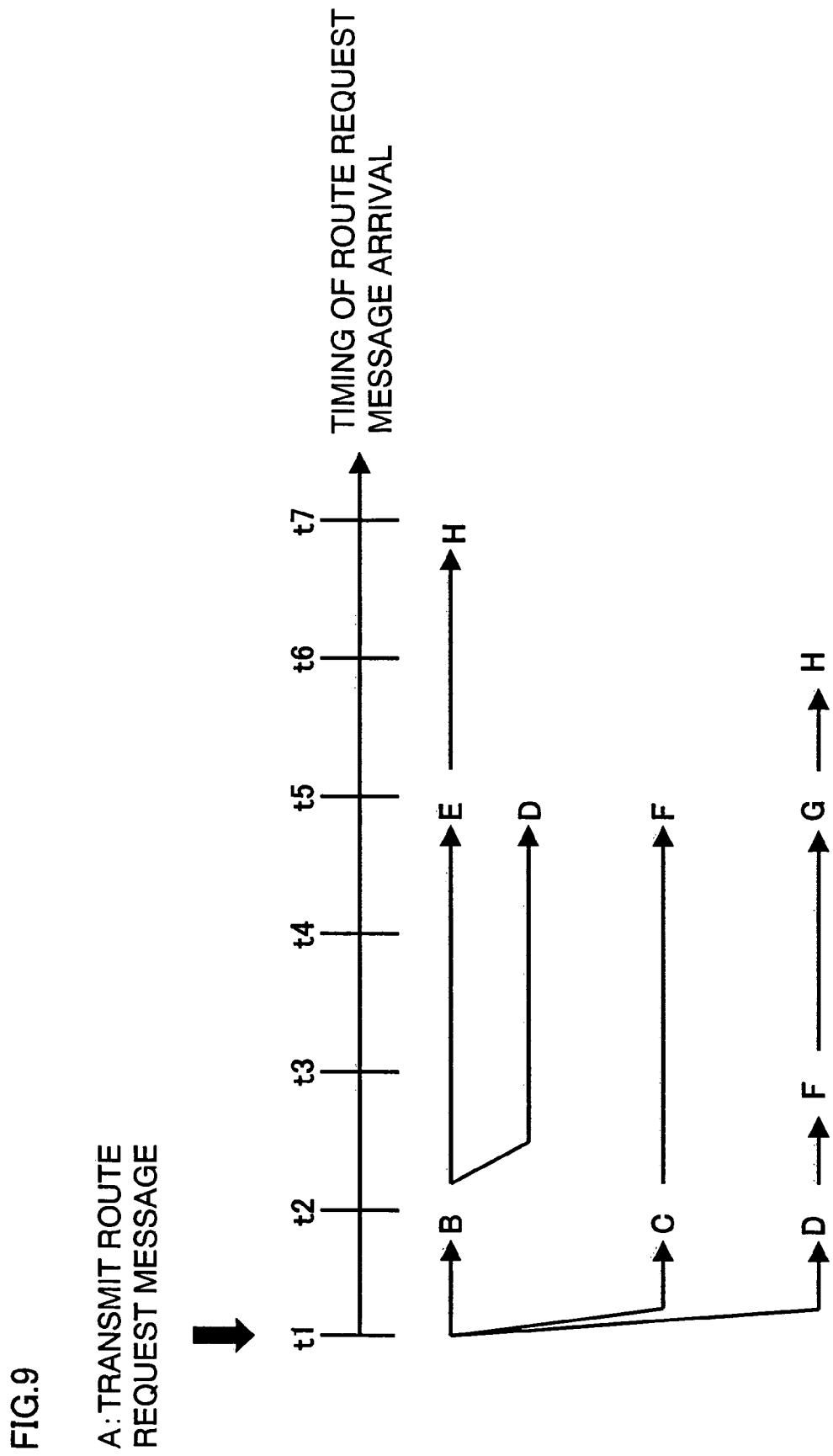
FIG. 9 is a chart showing the timing at which the route request message arrives in the ad hoc network according to the embodiment 1 of the invention.

FIG. 9 shows a time chart up until the route request message whose source is the radio communication device A (701) arrives at the destination radio communication device H (708) in the ad hoc network shown in FIGS. 7 and 8. After the route request message is broadcasted from the radio communication device A (701) at a time "t1", the route request message arrives at the radio communication devices B (702), C (703), and D (704) in the neighborhood of the radio communication device A (701) at a time "t2". Respective radio communication devices B (702), C (703), and D (704) set their timers for delaying the relay of the route request message in accordance with the battery remaining power of the devices themselves. Since the battery remaining power of the radio communication devices B (702) and C (703) is Low, they set the timer to "T2" so that the message arrives at neighboring radio communication devices at a time "t5". The battery remaining power of the radio communication device D (704) is High and the relay processing is performed immediately, therefore, the timer is set to "0". At a time "t3", the route request message which has been relayed by the radio communication device D (704) arrives at the radio communication device F (706), and in the same way, since the battery remaining power of the radio communication device F (706) is {Middle} level, the timer is set to "T1".

At the time "t5", the route request message arrives at the radio communication devices D (704), E (705), F (706) and G (707), but at this time the radio communication devices D (704) and F (706) have already relayed the route request message and therefore do not perform the relay processing, only the radio communication devices E (705) and G (707) performing the relay processing. The battery remaining power of the radio communication device E (705) is {Middle} level, therefore, the timer is set to "T1". The battery remaining power of the radio communication device G (707) is High, and therefore the relay processing is performed immediately. The route request message arrives first at the destination radio communication device by a route selected giving preference to radio communication devices whose battery remaining power level is high, and the destination radio communication device H (708) sends the route reply message to the source radio communication device through the radio communication devices through which the route request message was relayed.

In the above manner, a route selected giving preference to radio communication devices whose battery remaining power level is high can be acquired.

In the present embodiment, the battery remaining power level is divided into three stages, but it can be further divided into 4 stages or 5 stages, or it can be divided into 2 stages only. For example, in the case of 5 stages, they are labeled in order from higher to lower battery amounts as level 5, level 4, level 3, level 2, and level 1, and the respective delay amounts in these levels set to be {0, T4, T3, T2, T1} (with T4<T3<T2<T1). A radio communication device which is not operated by a battery and whose power is supplied by a cord to a power outlet, the battery remaining power level is set to be maximum and the delay amount is set to "0 (zero)" when performing the delay processing. In the above manner, a route selected giving preference to radio communication devices whose battery remaining power level is high can be acquired.

In the embodiment, the delay amount is decided by the ratio of the battery remaining power to the whole capacity thereof, but the delay amount may instead be decided based on estimated operating time estimated assuming that the radio communication devices will continue to be used as they are presently, taking the radio communication device whose estimated operating time is longer to be in better operating condition, and taking the radio communication device whose estimated-operating time is shorter to be in worse operating condition. For example, it can be realized by calculating battery consumption during the past 30 minutes, estimating that the same amount will be consumed from that time, and calculating time the device can be operated by the current battery remaining power.

The delay amount can be also decided by calculating how many bits of transmission will be possible from the power required for transmission per bit, regarding the radio communication device whose transmittable number of bits is larger as being in better operating condition, and the radio communication device whose transmittable number of bits is smaller as the one being in worse operating condition. For example, power consumption required for transmitting one frame can be calculated based on the power required for transmission and time required for transmitting one frame. The maximum number of bits that can be transmitted per one frame is prescribed based on the type of the radio interface and the data link control unit, therefore, it is possible to calculate how many bits can be transmitted with the current battery remaining amount based on the above.

In the embodiment, the battery remaining power is monitored and the delay amount is decided based on the battery remaining power, but a processing load monitor unit which monitors the CPU processing load of the device can be provided instead of the remaining battery capacity monitor unit 108 and the delay amount can be decided in accordance with the CPU processing load. Specifically, the delay amount is set to be smaller when the CPU processing load is lower, thereby obtaining a route selected giving preference to radio communication devices whose CPU processing load is low.

The relay timing of the route request message and the transmission timing of the route reply message are controlled by operating state information (battery remaining power, load and the like) of the device itself, and accordingly the metric calculation or operating state information stored in the route control message is not required, and therefore the overhead can be reduced. Since the exchange of control messages for determining the metric values is not required, the use of radio resources can be suppressed. As a result, the exchange of control messages for obtaining source information by which weighting of the links (metric) is calculated becomes unnecessary, and therefore the load of the radio communication device can be lightened.

In the embodiment, in order to prevent redundant packet transmission, when the delay processing is started, the receiving mode of the data link control unit 102 is set to the promiscuous mode by instructing the receiving mode setting unit. However, it is not always necessary to set to the promiscuous mode, and corresponding processings, namely, setting of promiscuous mode, cancellation thereof, and processing for stopping transmission of the route control messages due to capture of route control messages from other radio communication devices when setting the promiscuous mode can be skipped. In this case, it is not particularly necessary to provide a receiving mode setting unit. If a route request message is received later by the source radio communication device than the route reply message from another radio communication device, the source radio communication device merely disposes of the received route reply message. Accordingly, in this case, an appropriate route in accordance with the operating states of the radio communication devices can be obtained.

Embodiment 2

FIG. 12 to FIG. 16 show one embodiment of a radio communication device and a route discovery method according to an embodiment 2. FIG. 12 to FIG. 16 have the same fundamental configuration as the embodiment 1, and therefore the same reference numerals are given to the same components, explanations thereof are omitted, and only different components will be explained.

Figure 12:
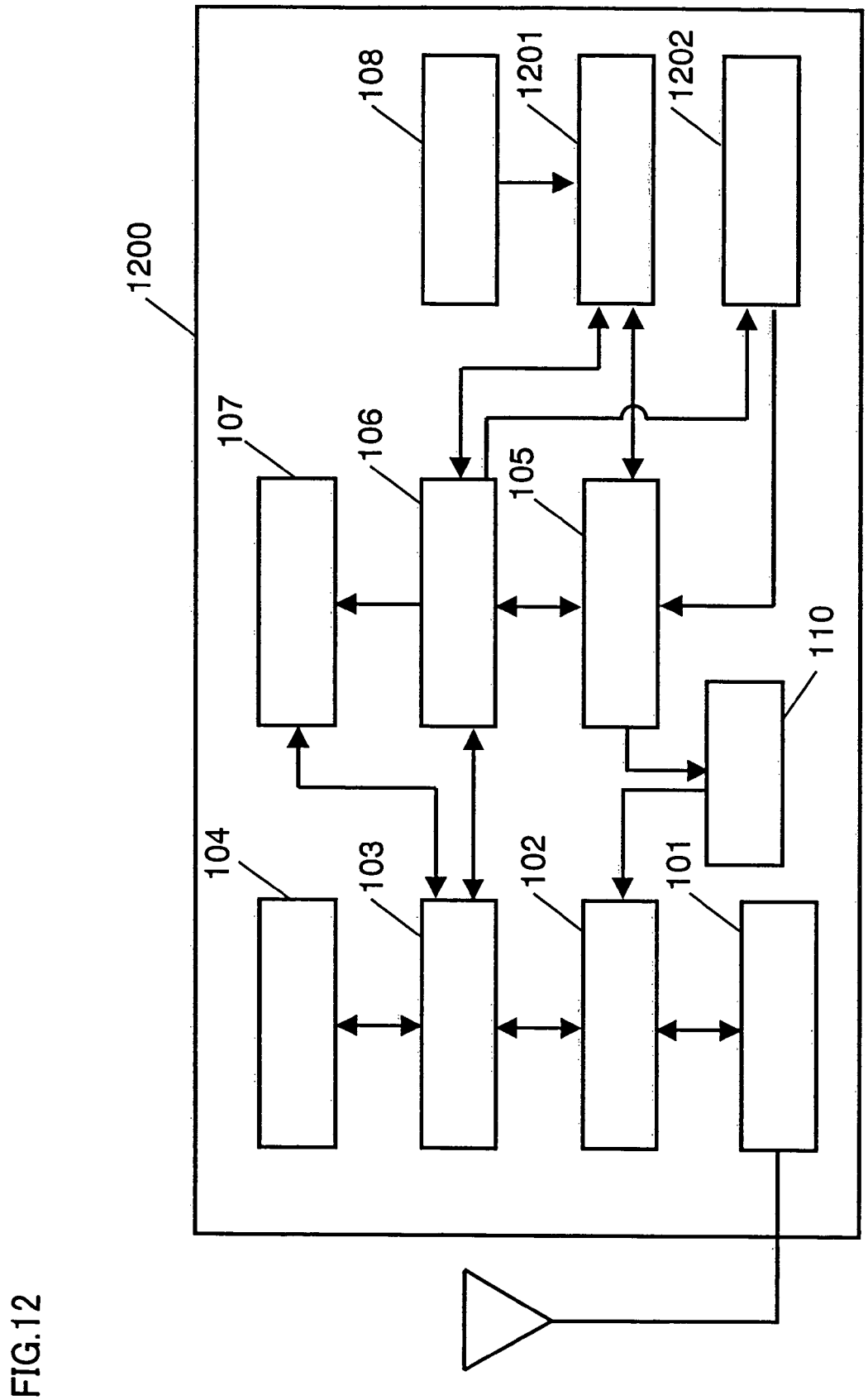
FIG. 12 shows a diagram showing a configuration of a radio communication device according to an embodiment 2 of the invention.

FIG. 12 is a block diagram showing a configuration of the radio communication device of the invention.

A route request message management unit 1201 has the function, explained in embodiment 1, of giving indexes for clearly distinguishing information stored therein, identifying a route request message from a specific source to a specific destination. FIG. 13 shows an example of a route request message table managed in the route request message management unit 1201.

A radio communication device having the route request message table shown in FIG. 13 has an entry showing that a route request message (the route request message identifier is "3") from a radio communication device "B" to a radio communication device "H" was received, that delay processing for delaying the relay forwarding of this route request message (or transmission of a route reply message) is performed, delay time being 10 ms, and that the index of this entry is "1". Similarly, the device has an entry showing that a route request message (the route request message identifier is "2") from the radio communication device "B" to a radio communication device "E" was received, that delay processing for delaying the timing of relay forwarding of the route request message (or transmission of the route reply message) is not operated, and that the index of this entry is "2".

Similarly, the device has an entry showing that the route request message (the route request message identifier is "17") from a radio communication device "F" to a radio communication device "G" was received and that the delay processing for delaying the timing of relay forwarding of the route request message (or transmission of the route reply message) is performed, the delay time being 14 ms, and that the index of this entry is "3".

A neighborhood relay table 1202 of a radio communication device is provided with a list of identifiers of other radio communication devices located in the area where the radio communication device can directly communicate with other devices and flags showing whether respective neighborhood request messages managed in the route request message management unit 1201 have been relayed or not. When the radio communication device receives a route request message from a neighboring radio communication device, the device checks which index of the route request message table corresponds to the combination of source identifier, destination identifier, and route request message identifier in the received message, and sets the flag in the neighborhood relay table 1202 at the field of the index and the identifier of the neighboring radio communication device which has transmitted the route request message.

FIG. 14 shows an example of information managed in the neighborhood relay table 1202. In FIG. 14, the neighboring radio communication device identifier 1401 shows that the adjacent radio communication devices are radio communication devices "B", "C" and "D". Further, the index receiving state 1402 shows whether the route request messages corresponding to respective indexes of the route request message table have been received from neighboring radio communication devices or not. For example, the radio communication device has received the route request message of the index 1 only from the radio communication device "B" and has not received it from the other radio communication devices "C" and "D".

The route request message management unit 1201 and neighborhood relay table 1202 are different from the configuration of the embodiment 1.

Operations and actions of the radio communication device having the above configuration will be explained as follows.

Figure 15:
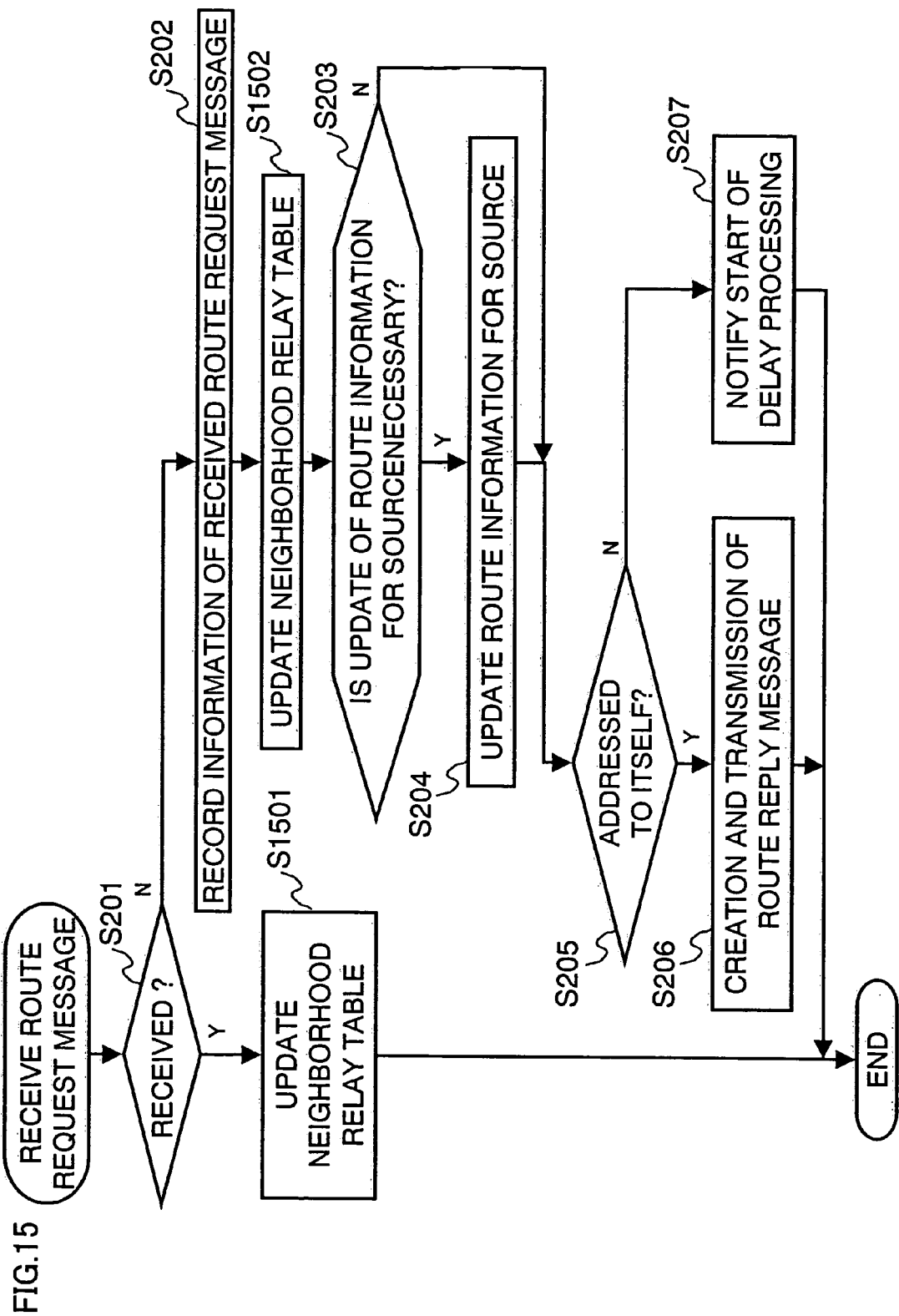
FIG. 15 is a chart showing a reception processing flow of a route reply message according to the embodiment 2 of the invention.

FIG. 15 shows a reception processing flow example of the route request message of the radio communication device according to the embodiment.

First, when the radio communication device receives the route request message, it examines carefully whether the combination of source identifier, destination identifier, and route request message identifier in the received message exists in the route request message table or not (step S201). When the judgment of the step S201 is "Yes", namely, when a reception processing has been already performed for that route request message, the identifier of the radio communication device which has transmitted the route request message and index of the route request message which is recorded in the route request message table are found, and the corresponding field in the neighborhood relay table 1202 is set to "received" (step S1501), thus ending the reception processing.

When the judgment of the step S201 is "No", the source identifier, destination identifier, and route request message identifier in the received route request message is recorded in the route request message table (S202), the identifier of the radio communication device which has transmitted the route request message and the index of the route request message which is recorded in the route request message table are found, and the corresponding field in the neighborhood relay table 1202 is set to "received" (step S1502).

The following processing is the same as the embodiment 1.

Figure 16:
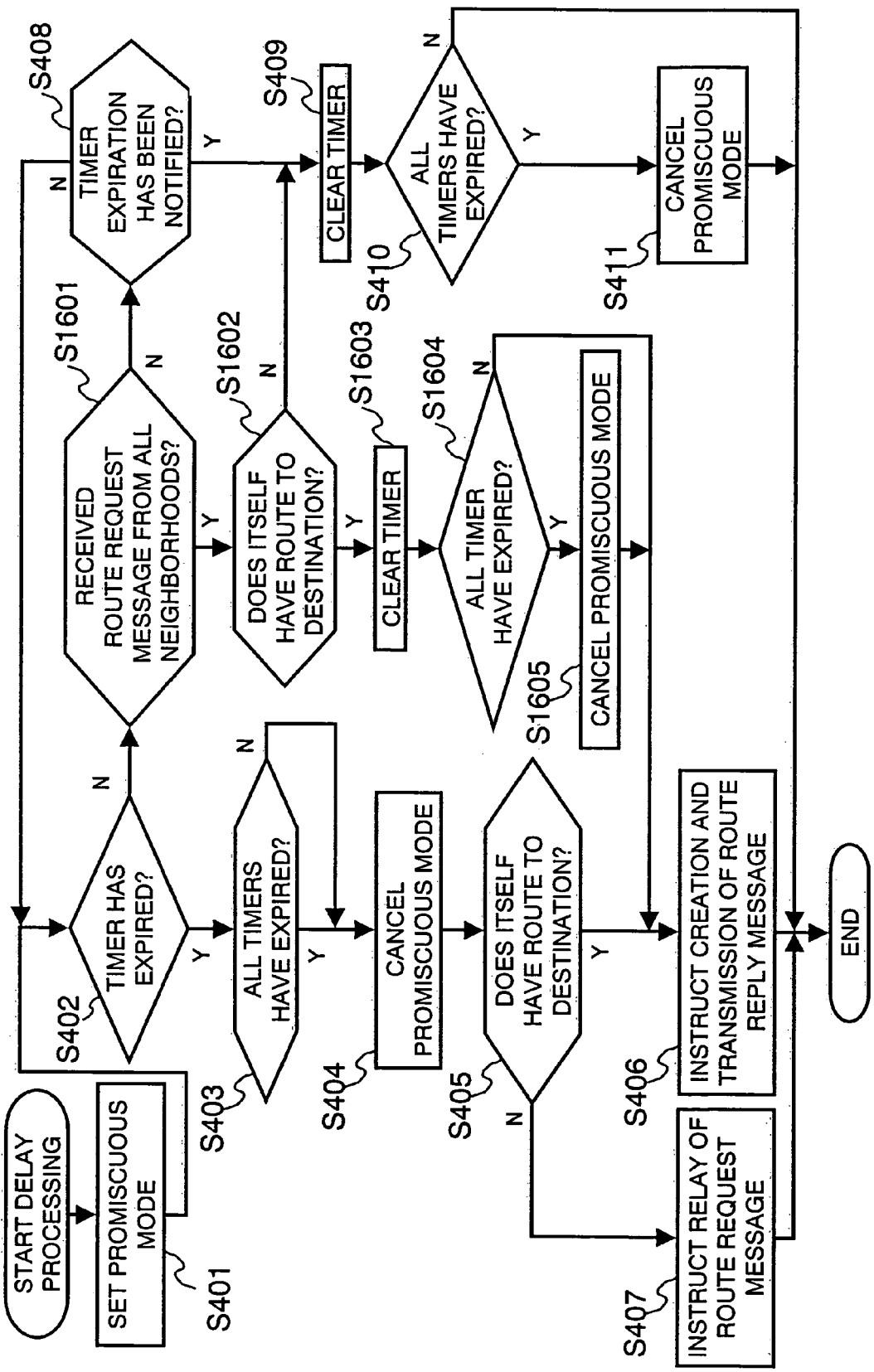
FIG. 16 is a chart showing a delay processing flow according to the embodiment 1 of the invention.

FIG. 16 shows a delay processing which is started when a timer is set in the step (step S207) of the reception processing of the route request message shown in FIG. 15, which is operated independently of the processing of the route request message and route reply message reception.

A point in which the delay processing operation differs from that of embodiment 1 is that, during operation of the timer in the step S402, the device checks whether the same route request message is received from all the neighboring radio communication devices and carries out processing accordingly. Hereinafter, this operation which differs from embodiment 1 will be explained.

When the judgment of the step S402 is "No", namely, when the time measured by the timer has not expired, the device waits until the timer expires to do the processing. During that time, if the route reply message corresponding to the combination of {source identifier, destination identifier, route request message identifier} for which the timer is activated is received from all the neighboring radio communication devices which can directly communicate with the radio communication device, the judgment in step S1601 is "Yes", and the process proceeds to step S1602. In the step S1602, the device judges whether it possesses a route to the destination or not. When the judgment of the step S1602 is "Yes", namely, the device possesses a route to the destination, the time being measured by the timer is made to expire (step S1603). At this time, if the times measured by all timers of other combinations have also expired, the promiscuous mode is cancelled (step S1605). After that, proceeding to the step S406, the delay processing unit 105 instructs the route control message processing unit 106 to make and transmit the route reply message.

When the judgment of the step S1602 is "No", namely, when the device does not possess a route to the destination, the process proceeds to the step S409, the time measured by the timer is made to expire, and the delay processing for the above source identifier, destination identifier, and route request message identifier is finished without performing the relay forwarding processing for the route request message or the transmission processing of the route reply message. The reception of the same route request message from all the neighboring radio communication devices means that all the neighboring radio communication devices have already received the route request message from other radio communication devices, and it is not necessary to make a relay forwarding anew from the radio communication device. At this time, when the times measured by all timers of other combinations have also expired, the promiscuous mode is cancelled (step S411).

When the step S1601 is judged as "No", the process proceeds to step S408.

The reception processing of the route reply message is same as the embodiment 1.

In the embodiment, in order to identify the route request message, an index is provided, but this index is not essential, and it is possible to specify the route request message by a combination of the source identifier and the route request message identifier.

According to the above, when the same route request message is transmitted from all the radio communication devices located in the neighborhood of the radio communication device, unnecessary transmission of the route request message can be prevented by stopping the relay processing of the radio communication device, and as a result, power consumption of the radio communication device can be reduced.

In the embodiment, when the delay processing is started, the data link control unit 102 is set to the promiscuous mode by instructing the receiving mode setting unit. However, it is not always necessary to set to the promiscuous mode, so that the corresponding processing, namely setting and canceling of the promiscuous mode, can be skipped. In this case, it is not particularly necessary to provide a receiving mode setting unit. In the case where the device receives the route request message later than the route reply messages from another radio communication devices, even if the source radio communication device receives the route reply message, this device merely deletes the received route reply message. Accordingly, also in this case a route in appropriate to the operating states of the radio communication devices can be obtained.

Embodiment 3

Figure 17:
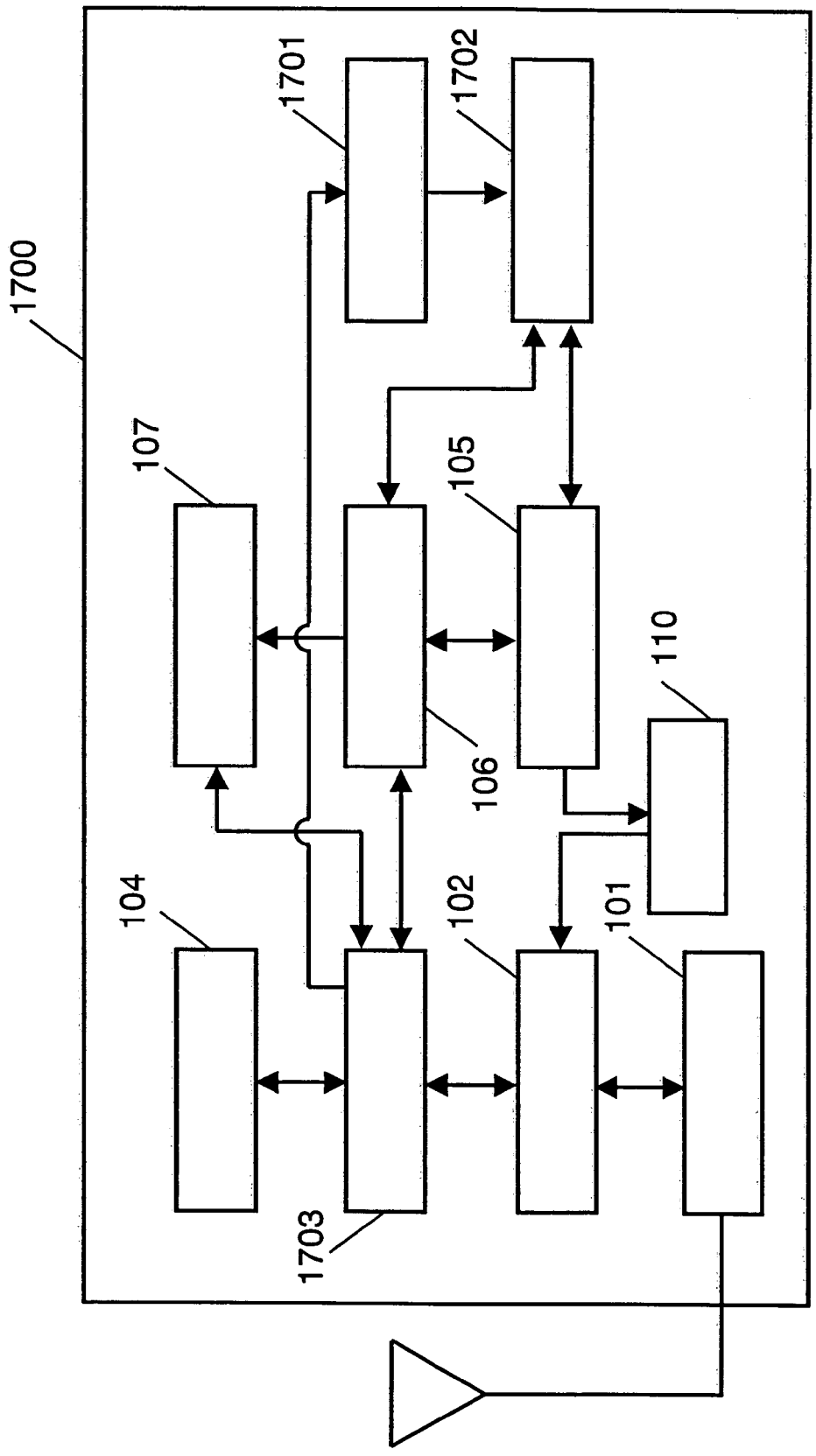
FIG. 17 is a diagram showing a configuration of a radio communication device according to an embodiment 3 of the invention.
Figure 19:
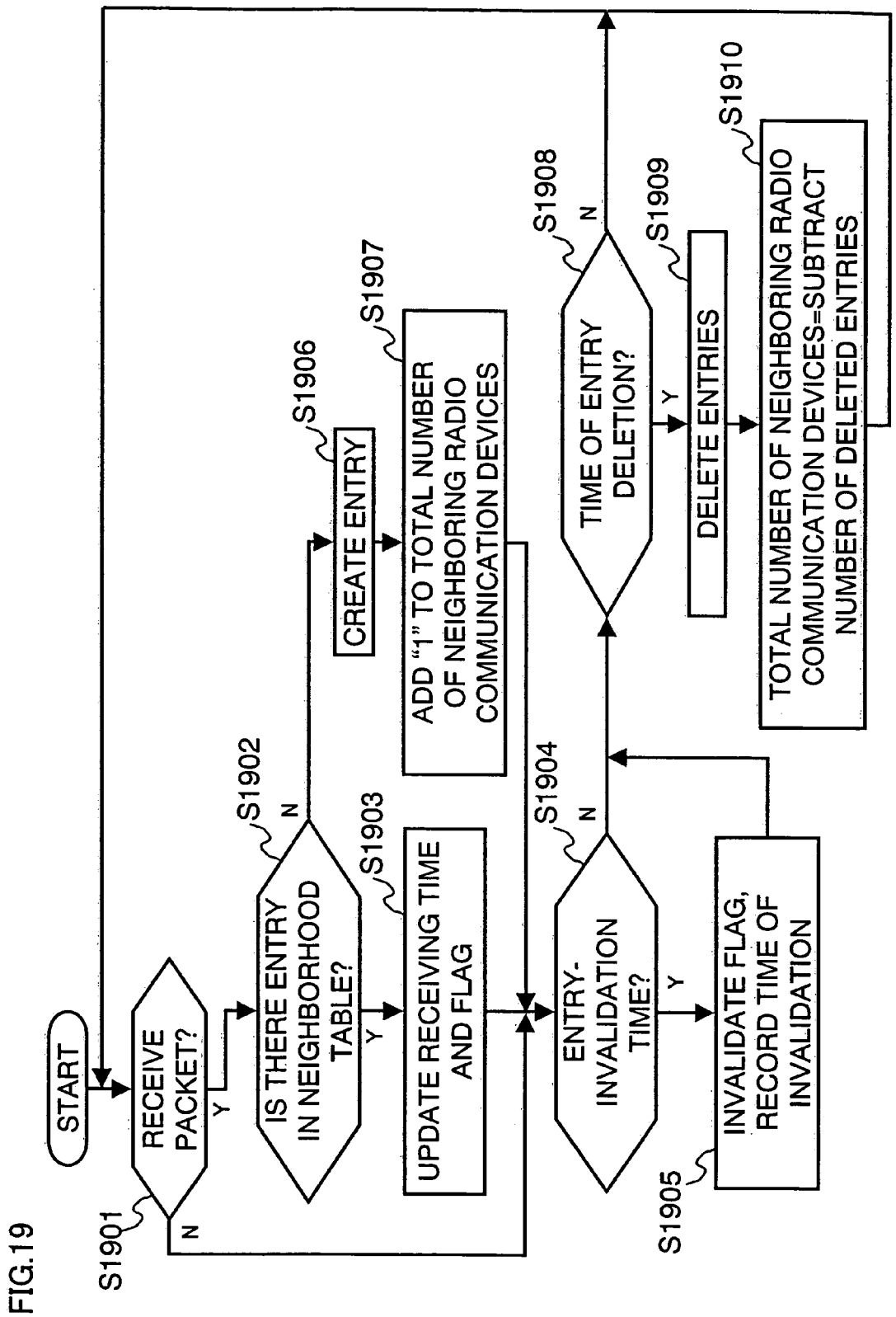
FIG. 19 is a chart showing an updating operation flow of the neighborhood table according to the embodiment 3 of the invention.

FIG. 17 to FIG. 19 show a radio communication device and a route discovery method according to embodiment 3.

FIG. 17 is a block diagram showing a configuration of a radio communication device 1700 according to the embodiment. In FIG. 17, a neighborhood table management unit 1701, a route request message management unit 1702 and a network controller 1703 are different from the embodiment 1. Functions of these components will be explained as follows.

The neighborhood table management unit 1701 performs management for the neighborhood of the radio communication device, namely, radio communication devices in the area where the radio communication device can directly communicate with them, managing identifiers of these radio communication devices, receiving time of packets, flags showing validity/invalidity thereof and the total number of the radio communication devices. FIG. 18 shows an example of a neighborhood table in the neighborhood table management unit 1701.

In FIG. 18, the total number of neighboring radio communication devices 1801 shows the total number of the radio communication devices in the neighborhood of the radio communication device, the receiving time 1802 shows the times when packets from the radio communication devices indicated by the neighborhood radio communication device identifier 1401 were received, and a valid flag 1803 shows whether that radio communication device is operating validly or not. For example, this case shows that there exist three radio communication devices in the neighborhood of the radio communication device, that the device receives packets from the radio communication devices identified by identifiers "G", "F", and "E" at a time 10212, a time 10220, and a time 09857 respectively, and that the radio communication devices "G" and "F" are currently located in the neighborhood, however, the radio communication device "E" is not located in the neighborhood.

The route request message management unit 1702 differs from the route request message management unit 109 of the embodiment 1 in that the timer value 1105 in the route request message shown in FIG. 11 is set based on the total number of neighboring radio communication devices in the neighborhood table 1701. The setting value of the timer is, for example, "0" when the total number of neighboring radio communication devices is 3 or less, "T1" when the number is 4 to 6, and "T2" when the number is 7 or more (where T1<T2).

A processing in which the route request message management unit 1702 calculates the delay amount will be explained.

In the case that the route request message management unit 1702 decides the delay amount in accordance with the number of neighboring radio communication devices, for example, the standard number of neighboring radio communication devices is prescribed. When this number is 12, and the current number of neighboring radio communication devices of the radio communication device is 5, the relay delay amount can be found by the following formula based on the (formula 1) shown in the embodiment 1.

$$160/\{2\times10\times(12-5)\}=1.2 \text{ ms}$$

When the number of neighboring radio communication devices is more than the standard number of neighboring radio communication devices, the relay delay amount will be the maximum value of the delay amount. As shown in the embodiment 3, when the number of neighboring radio communication devices is divided into three stages: 3 or less {level 1}, 4 to 6 {level 2}, and 7 or more {level 3} (resolution is 3), the delay amount is also divided into three stages for the maximum delay amount, namely, {delay 0 ms, delay 4 ms, delay 8 ms}. In the case that the number of neighboring radio communication devices is 8, it is {level 3}, and therefore the relay of the route request message is performed after 8 ms have passed.

The network controller 1703 is different in that it has a function of giving packet reception time and the identifier of the transmitting radio communication device to the neighborhood table management unit 1701 for updating the neighborhood table when network controller 1703 receives a packet, in addition to the function of the network controller 103 shown in the embodiment 1.

Operations and actions of the radio communication device having the above configuration will be explained as follows.

FIG. 19 is a flow chart showing an update procedure of the neighborhood table managed by the neighborhood table management unit 1701.

First, when the radio communication device is activated by switching on the power of the radio communication device, performing a reset or the like, a neighborhood table update processing is started. The network controller 1703 judges whether a packet has been received or not (step S1901), and when one has not been received, the process proceeds to step S1904.

On the other hand, when a packet has been received, the neighborhood table management unit 1701 is notified, and then the neighborhood table management unit 1701 judges whether there is an entry of the radio communication device which has transmitted the packet in the neighborhood table (step S1902). When the judgment is "Yes" in the step S1902, namely, when there already is an entry, the neighborhood table management unit 1701 updates the reception time field of the corresponding entry to the time when the packet was received, and also updates the valid flag field to "valid" (step S1903).

When the judgment is "No" in the step S1902, the neighborhood table management unit 1701 makes an entry consisting of {identifier of the radio communication device which has transmitted the packet, reception time, valid flag (=valid)}(step S1906), adding "1" to the total number of neighboring radio communication devices 1801 (step S1907), and the process proceeds to the step S1904.

In the step S1904, the neighborhood table management unit 1701 judges whether the valid flag timeout time period value has passed or not since the reception time of the entry where the valid flag is on. For example, in the case that the valid flag timeout value is 10 seconds, the neighborhood table management unit 1701 judges whether there is an entry or not, in which the difference between the present time and the reception time is 10 seconds or more among all entries where the valid flags are valid (step S1904). When there exists such entry, the corresponding valid flag is set to "invalid" and the present time is recorded in the reception time field (step S1905), and then the process proceeds to step S1908.

When the judgment is "No" in the step S1904, namely, when there are only entries in which the differences between the present time and the receiving time are 10 seconds or less and entries in which the valid flags are set to invalid, the process proceeds to step S1908.

Next, in the step S1908, the neighborhood table management unit 1701 judges whether the entry timeout value has passed or not since the reception time of the field value of the entry where the valid flag is invalid. For example, in the case that the entry flag timeout value is 10 minutes, the neighborhood table management unit 1701 judges whether there is an entry in which the difference between the present time and the receiving time is 10 minutes or more among all entries where the valid flag is invalid (step S1908). When the judgment is "Yes", namely, when there are entries to be deleted, the neighborhood table management unit 1701 deletes all those entries (step S1909). The total number of neighboring radio communication devices 1801 is subtracted by the number of deleted entries (step S1910), and the process returns to the step S1901.

When the judgment is "No" in the step S1908, namely, when there is no entry to be deleted, the process just returns to the step S1901.

The reception processing of the route request message, the reception processing of the route reply message and the delay processing are same as the embodiment 1 except that the timer value is set based on the total number of neighboring radio communication devices on the neighborhood table.

According to the above, the route selected giving preference to radio communication devices around which few other radio communication devices are located, that is, the radio communication device having few opportunities for performing the relay to another radio communication device can be obtained, and as a result, relay processing can be prevented from concentrating in one radio communication device.

In the embodiment, the number of neighboring radio communication devices is divided into three stages for determining the delay amount, and the value is "0" when the total number is 3 or less, "T1" when the number is 4 to 6, and "T2" when the number is 7 or more (at this time, T1<T2). However, it is not limited to this and the same effect can be obtained when the delay amount is set by the number of neighboring radio communication devices without dividing into levels, or by dividing into a different number of stages.

The configuration in which the neighborhood relay table shown in the embodiment 2 is added is also possible. In this case, unnecessary transmission of the route request message can also be prevented by stopping the relay processing of the radio communication device when the route request message is transmitted from all radio communication devices located in the neighborhood of the radio communication device, and as a result power consumption of the radio communication device can be reduced.

The total number of neighboring radio communication device is recorded in the embodiment, however, this is not essential, and the same effect can be realized by recounting the number of entries in the neighborhood relay table when a route request message is received.

Embodiment 4

Figure 20:
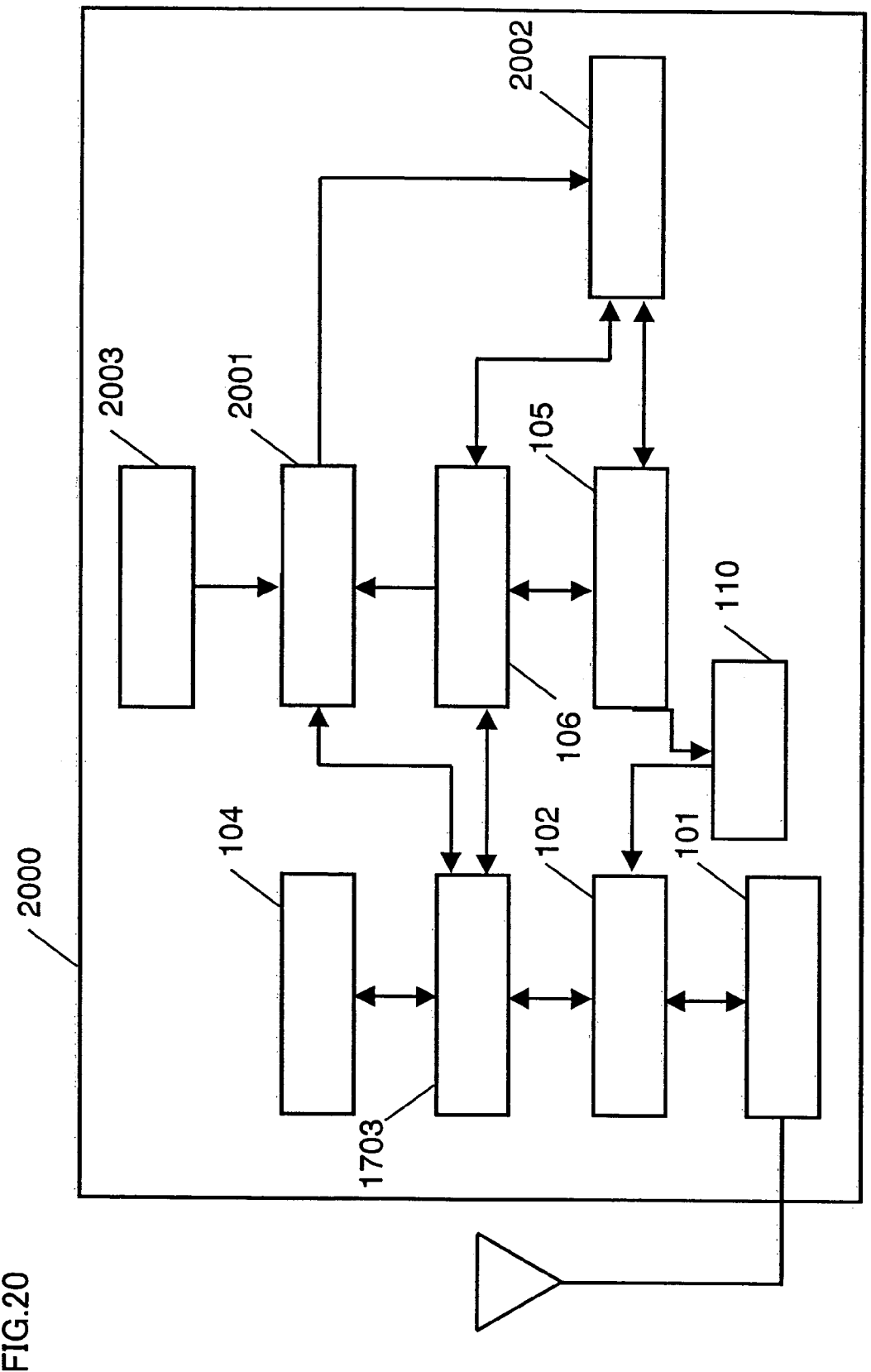
FIG. 20 is a diagram showing a configuration of a radio communication device according to an embodiment 4 of the invention.

FIG. 20 and FIG. 21 show a radio communication device and a route discovery method according to an embodiment 4.

FIG. 20 is a block diagram showing a configuration of a radio communication device 2000 according to the embodiment. In FIG. 20, the configuration is different in that a route information number management unit 2003 is included and in that route recording unit 2001 and route request message management unit 2002 have new functions.

The route recording unit 2001, in the same way as in the embodiment 1, receives the destination radio communication device identifier, the next hop radio communication device identifier and the destination radio communication device sequence number from the route control message processing unit 106 based on the route request message and the route reply message and records them as route information. Further, the route recording unit 2001 receives instruction concerning information of the total number of valid routes, life time and valid flag by a route information number management unit 2003 and updates the route information.

FIG. 21 shows an example of route information recorded in the route recording unit 2001. In FIG. 21, information of the total number of valid routes 2101 shows the total number of routes entered in the route recording unit 2001, life time 2102 shows the valid time during which the route information is valid, and a valid flag 2103 shows whether the route information is valid or not. For example, the information of the total number of valid routes possessed by the radio communication device is 2, the contents thereof are as follows.

Specifically, route information is entered which shows that the relay forwarding destination of a packet addressed to a radio communication device "G" is a radio communication device "D", that the sequence number of the radio communication device "G" is 20, that the life time thereof is up to time 12427, and that this entry is valid. Similarly, route information is entered which shows that the relay forwarding destination of a packet addressed to a radio communication device "F" is the radio communication device "D", that the sequence number of the radio communication device "F" is 2, that the life time thereof is up to time 10822, and that this entry is valid. In the same way, route information is entered which shows that the relay forwarding destination of a packet addressed to a radio communication device "E" is a radio communication device "B", that the sequence number of the radio communication device "E" is 4, that the life time thereof is up to time 00251, which has already passed so that the entry is invalid.

The route information number management unit 2003 manages information of the number of valid entries of routes recorded in the route recording unit 2001. When the route number information management unit 2003 acquires route information and the entries in the route information recording unit 2001 increase, or when an existing entry which is "invalid" changes to the entry which is "valid", "1" is added to the number of valid entries. During a previously fixed period of time (for example, 30 seconds) or during the life time prescribed by the life time 604 included in the route reply message, the valid flag 2103 of the corresponding entry in the route recording unit 2001 is set to "valid", and when the life time has passed, the route recording unit 2001 is instructed so that the valid flag 2103 is set to "invalid" and "1" is subtracted from the number of the valid entries. When the flag becomes invalid and the prescribed time (for example, 10 minutes) has passed, the route recording unit 2001 is instructed so as to delete the route information. The route recording unit 2001 updates the route information on receipt of the instruction.

When a packet is passed from the network controller 103 to the data link control unit 102, the network controller 103 decides the transmission destination based on information of the route recording unit 107. Further, when the route request message or the route reply message is passed from the route control message processing unit 106 to the network controller 103, the network controller 103 decides the transmission destination based on information of the route recording unit 107, adding a packet header.

The route request message management unit 2002 differs from the route request message management unit 109 in the embodiment 1 in that the timer value 1105 in the route request message table shown in FIG. 11 is set based on information of the total number of valid routes from the route recording unit 2001. The setting value of the timer is, for example, "0" when the information of the total number of valid routes is 3 or less, "T1" when it is 4 to 6, and "T2" when it is 7 or more (at that time, T1<T2).

Concerning the processing in which the route request message management unit 2002 calculates the delay amount, when the route request message management unit 2002 decides the delay amount depending on information of the number of valid entries of routes, the delay amount is decided by prescribing a standard number of the route information valid entries, or by prescribing the resolution and the contents thereof in the same way as in the case of using the number of neighboring radio communication devices.

By deciding the delay amount as above, the upper limit of delay amount delaying the route request message to the destination radio communication device can be prescribed, and therefore more delay than necessary can be prevented. The reception processing of the route request message, the reception processing of the route reply message, and the delay processing are same as in the embodiment 1 except that the timer value is set based on the information of the total number of valid routes. The update of route information such as the information of the total number of valid routes or the valid flag by the route information number management unit 2003 is performed in parallel, independent of the reception processing of the route request message, the reception processing of the route reply message and the delay processing.

In the above manner, the source radio communication device can obtain a route selected giving preference to radio communication devices having only information of a few routes for actually performing the relay processing, and the relay processing can be prevented from concentrating in one radio communication device.

In the embodiment, the information of the total number of valid routes for determining the delay amount is divided into three stages, and the value is "0" when the total number is 3 or less, "T1" when the number is 4 to 6, and "T2" when the number is 7 or more (at this time, T1<T2). However, the embodiment is not limited to this, and the same effect can be obtained when the delay amount is set based on the number of neighboring radio communication devices without dividing numbers into levels, or by dividing into more than three stages.

The configuration in which the neighborhood relay table shown in the embodiment 2 is added is also possible. In this case, unnecessary transmission of the route request message can also be prevented by stopping the relay processing of the radio communication device when the route request message is transmitted from all radio communication devices located in the neighborhood of the radio communication device, and as a result, power consumption of the radio communication device can be reduced.

The information of the total number of valid routes is recorded in the embodiment, but this is not essential, and the same effect can be realized by recounting the number of entries of route information entered in the route recording unit 2001 when the route request message is received.

Embodiment 5

Figure 22:
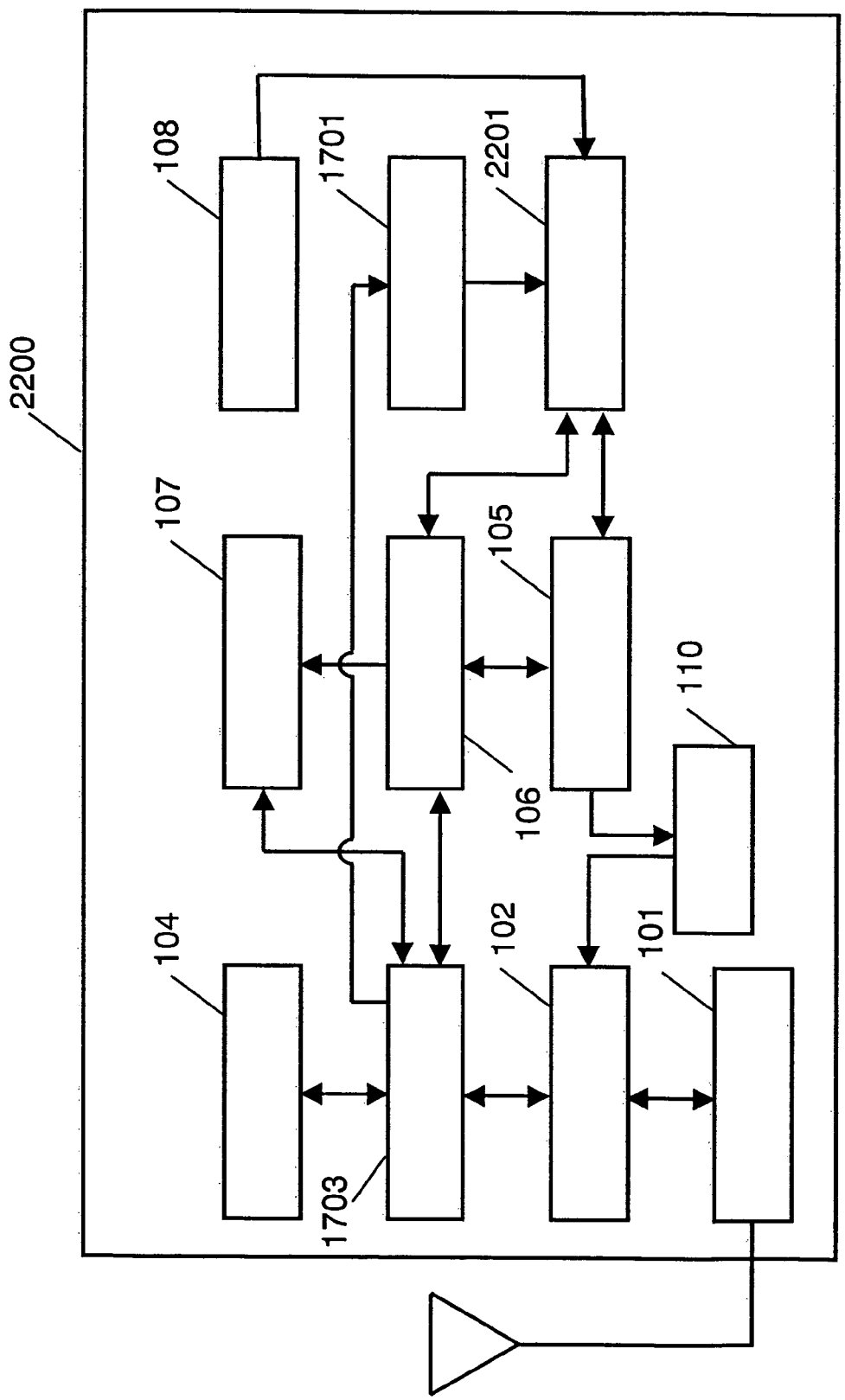
FIG. 22 is a diagram showing a configuration of a radio communication device according to an embodiment 5 of the invention.

FIG. 22 to FIG. 23 show a radio communication device and a route discovery method according to an embodiment 5. FIG. 22 shows a configuration of a radio communication device 2200 according to the embodiment, in which the embodiment 1 combines with the embodiment 3, and which is different from these embodiments in that the route request message management unit includes a new function.

In the embodiments 1 to 4, the route request message management unit sets the timer value for performing the delay processing based on the battery remaining power, the total number of the neighboring radio communication devices, and information of the number of valid routes in the route recording unit. In the present embodiment, the route request message management unit 2201 also includes a delay amount decision table, and decides the delay amount from the delay amount decision table and sets the timer value of the route request message table based on information of the remaining battery capacity monitor unit 108 and the neighborhood table management unit 1701.

FIG. 23 shows an example of the delay amount decision table. In FIG. 23, respective levels of the battery remaining power and the total number of neighboring radio communication devices are respectively divided into three stages. For example, when the battery remaining power of the radio communication device is {Middle} level, and the total number of the neighboring radio communication devices is {5}, the route request message management unit 2201 sets the timer value of the route request message table to the time "T4" (2301). According to this, the relay processing unit 105 performs the processing which delays transmission of the route reply message for the time "T4" when relaying the route request message or when the radio communication device itself is not the destination and has a route.

According to the above, the source radio communication device can obtain a route selected giving preference to radio communication devices in an area where few radio communication devices are located in the neighborhood, that is, an area where the radio communication devices are not close to each other, and which also have enough battery remaining power, and therefore the relay loads of the radio communication devices can be leveled and a route having long valid time can be obtained.

In the embodiment, the battery remaining power of the radio communication device and the total number of neighboring radio communication devices are parameters for deciding the delay amount, but it is possible that the battery remaining power and information of the number of valid routes are made to be parameters by providing the route number information management unit 2003 written in the embodiment 4 instead of the neighborhood table management unit 1701.

In the above manner, the source radio communication device can obtain a route selected giving preference to radio communication devices having information of only a few routes for actually performing the relay processing and also having enough battery remaining power, and therefore, the relay load of each radio communication device can be leveled and a route usable for a long valid time can be obtained.

Embodiment 6

Figure 24:
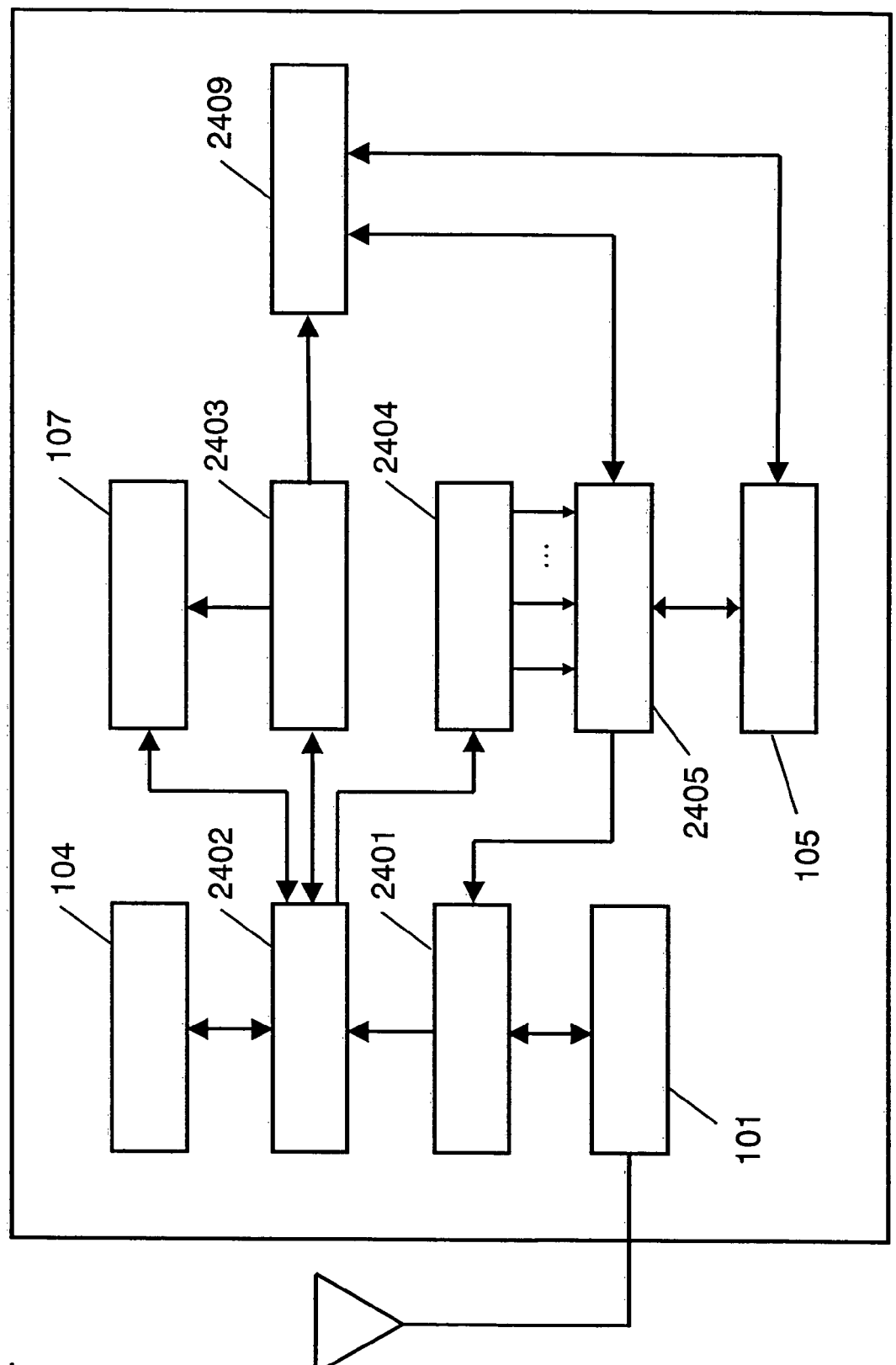
FIG. 24 is a diagram showing a configuration of a radio communication device according to an embodiment 6 of the invention.

FIG. 24 is a block diagram showing a configuration according to the embodiment. The configuration differs from the one of the embodiment 1 in that a flow identification processing unit 2404 and a buffer management unit 2405 are included, and in that the remaining battery capacity monitor unit 108 is not included.

The data link control unit 2401 differs from the one of the embodiment 1 in that transmission data is not received from a network controller directly but extracted from the buffer management unit 2405.

A network controller 2402 differs from the one in the embodiment 1 in that transmission data to be given to the data link processing unit by adding an IP header is given to the flow identification processing unit 2404, not to the data link processing unit.

A route control message processing unit 2403 differs from the one of the embodiment 1 in that it further includes the processes of making a notification to a route request message management unit 2409 when it receives a route request message whose destination is not the device itself, and of giving the route request message to the network controller 2402 for broadcasting again when it receives an instruction to allow relay forwarding from the route request message management unit 2409.

The flow identification processing unit 2404 receives data to be transmitted from the network controller 2402, determines what kind of data it is, and outputs it to the buffer management unit 2405 one data kind at a time.

The buffer management unit 2405 stores data received from the flow identification processing unit 2404 to respective buffers according to the flow type. The buffer management unit 2405 performs a scheduling processing which transmits data stored in buffers in order of priority suitable for the flow. In the scheduling processing, data to be transmitted next is decided based on the order of priority of respective buffers assigned according to the flow, and the data extracted from the buffer is given to the data link control unit 2401.

When the route request message management unit 2409, receives the notification of receiving the route request message from the route control message processing unit 2403, the route request message management unit 2409 checks the state of available buffers stored in the buffer management unit 2405 and judges whether the buffer corresponding to the flow type given in the route request message has an available capacity more than a prescribed reference threshold value or not. When the available capacity is more than the reference threshold value, a timer valid flag 1104 in the route request message table shown in FIG. 11 is set to valid, and the delay time based on the degree of the available capacity is set to be the timer value 1105. For example, the available capacities of more than the reference threshold value are further judged according to threshold values to be in one of three levels; the timer value is set to "0" when the available capacity is at the maximum level, the timer value is set to "5" when the available capacity is in the second level, and the timer value is set to "10" when the available capacity is in the minimum level.

In the case that buffer does not have available capacity more than the reference threshold value, the timer valid flag 1104 is set to invalid. The route request message management unit 2409 differs from the one of the embodiment 1 in that these functions are further included.

Figure 25:
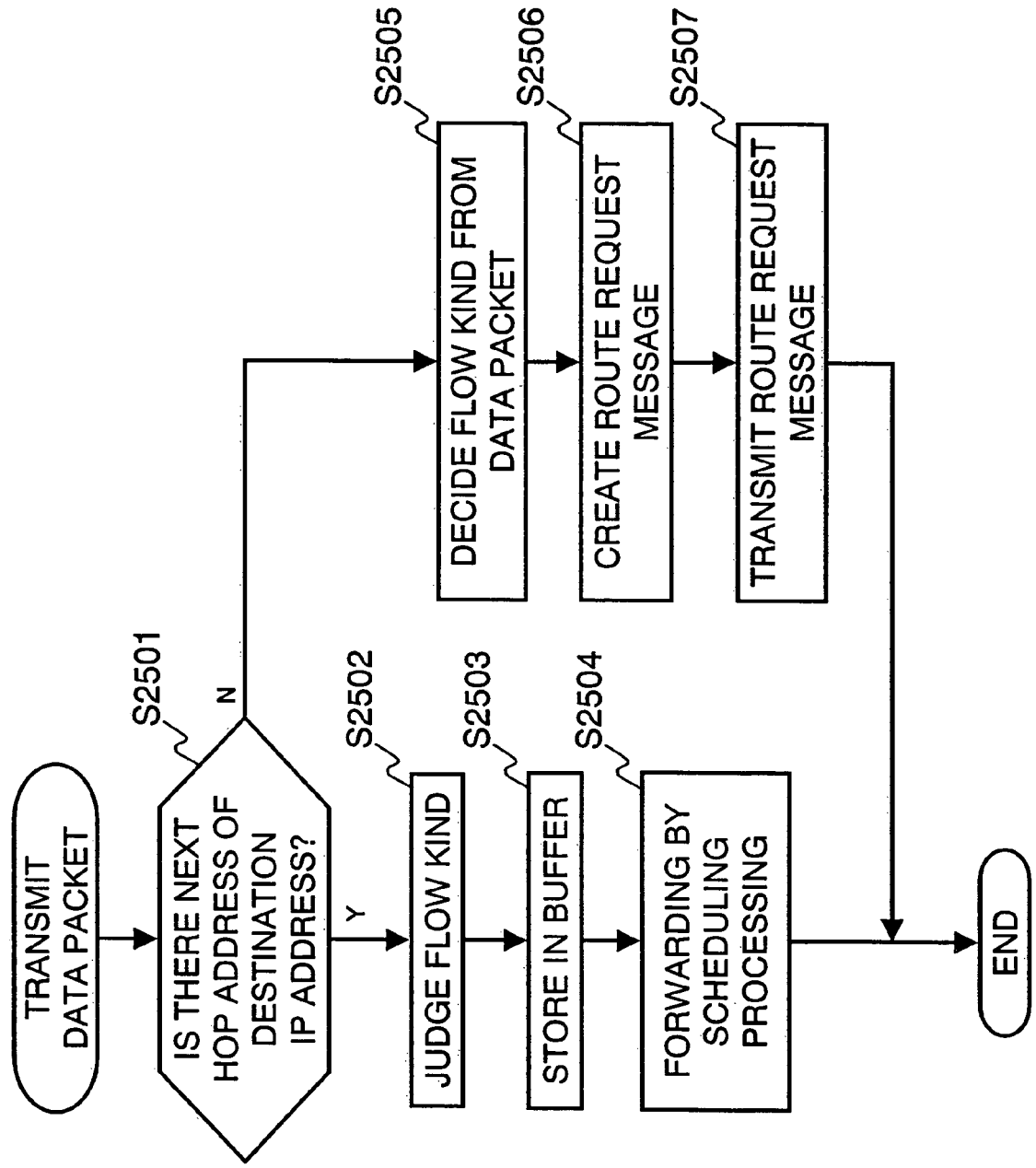
FIG. 25 is a chart showing a processing flow when a packet data is transmitted in the radio communication device according to the embodiment 6 of the invention.

FIG. 25 shows a processing flow when transmitting packet data from a radio communication device of the embodiment. When the packet is transmitted from a network application such as an e-mail or an IP telephone, the upper layer processing unit 104 designates a destination radio communication device identifier (destination address) which indicates the destination radio communication device, and requests the network controller 2402 to transmit the data packet. The network controller 2402 verifies whether there is route information corresponding to the destination address in the route recording unit 107 or not (step S2501).

When there is a next hop identifier (next hop address) corresponding to the destination address in the route information, the flow identification processing unit 2404 judges the kind of data flow (for example e-mail or IP telephone) (step S2502) and writes that flow type in the corresponding buffer (step S2503). The buffer management unit 2405 performs the scheduling processing on the packet data and transmits it to the data link processing unit 2401 in accordance with the priority order of data (step S2504). The data link processing unit 2401 transmits the data to the radio interface 101 after adding the hardware address of a data link layer corresponding to the source radio communication device identifier (source address), and adding the hardware address corresponding to the address of the next hop of the destination address. The radio interface 101 modulates a signal received from the data link control unit 2401, converts it to a radio signal, and transmits the signal from an antenna.

On the other hand, when there is no next hop address corresponding to the destination address, the following route discovery processing is performed.

The flow identification processing unit 2404 decides the flow type from a protocol number or a port number of a transport layer (TCP/UDP) of the data packet (step S2505). After the flow identification processing unit 2404 decides the flow type, it writes the code corresponding to the flow type in a flow type field 2601 in the route request message shown in FIG. 26 (step S2506) and transmits the message (step S2507). For example, in the case that the flow type is identified as two kinds, namely, a real-time stream or a non real-time stream, the real-time stream is written as "0" and the non real-time stream is written as "1" in the message to be transmitted.

Next, processings when receiving a route request message will be explained with reference to FIG. 27.

Figure 27:
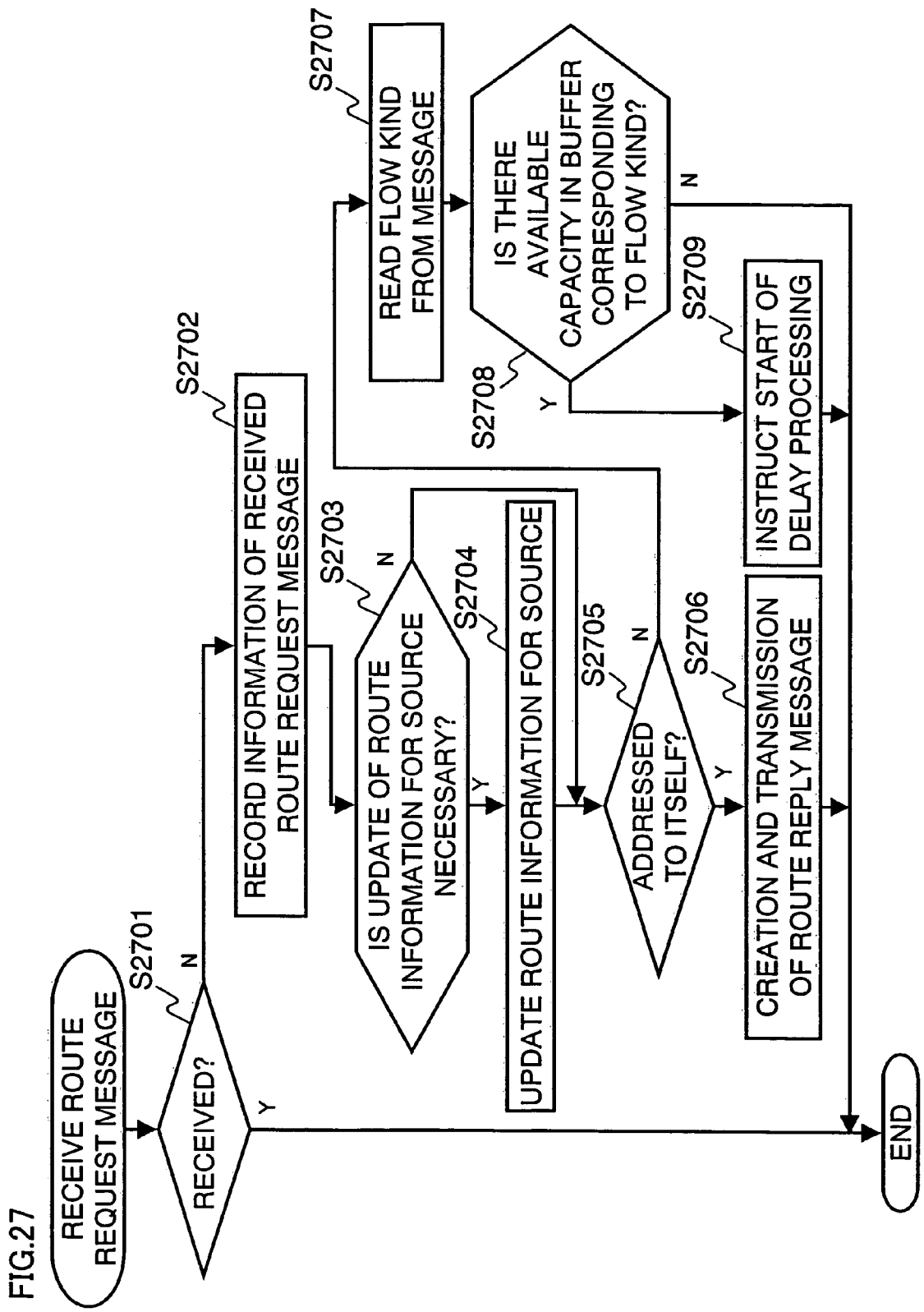
FIG. 27 is a chart showing a reception processing flow of the route request message according to the embodiment 6 of the invention.
Figure 28:
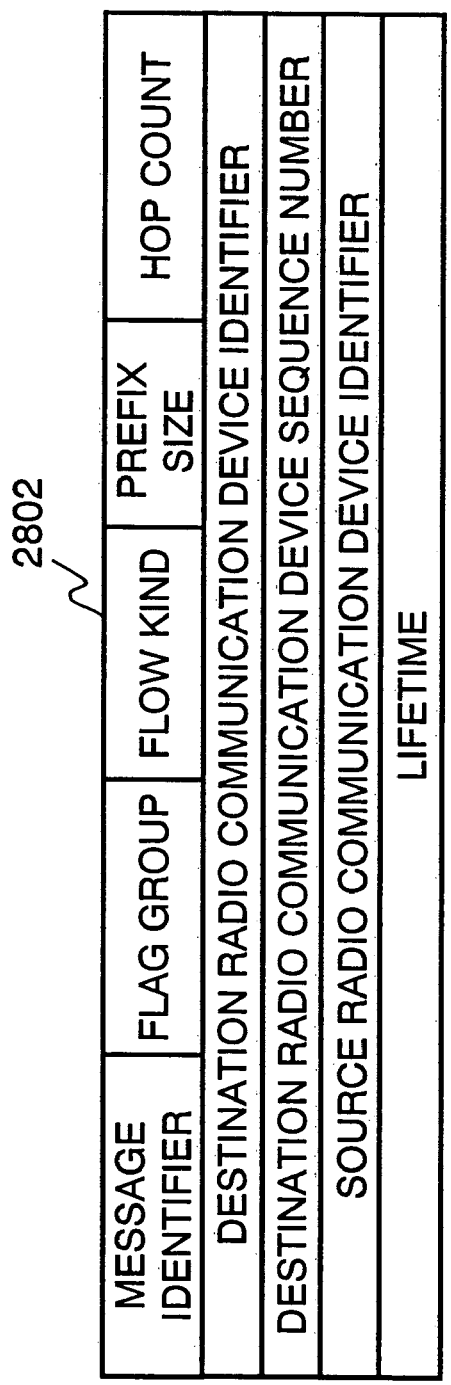
FIG. 28 is a table showing a format of a route reply message according to the embodiment 6 of the invention.

In FIG. 27, processings from step S2701 to step S2705 are same as the embodiment 1. In the step S2705, the route control message processing unit 2403 judges whether the radio communication device itself is the destination radio communication device of the route request or not (step S2705), and when it is the destination radio communication device, the route control message processing unit 2403 creates a route reply message as shown in FIG. 28 and transmits the route reply message to the transmission source after adding a packet header whose destination is the radio communication device identifier of the next hop and whose transmission source is the device itself, based on route information to the transmission source which is stored in the route recording unit 107 (step S2706).

When the judgment is "No" in the step S2705, that is, when the device itself is not the radio communication device the route to which is requested, the flow type is read from the route request message (step S2707).

Next, the route request message management unit 2409 requests the buffer management unit 2405, operating according to the inputted flow type, to verify the available state of the buffer (step S2708). If available capacity in the buffer to be used is more than the threshold value which has been previously set, the route request message management unit 2409 sets the prescribed timer value in the route request message table and instructs the delay processing unit 105 to start the delay processing (step S2709). The delay processing is same as the embodiment 1.

Figure 29:
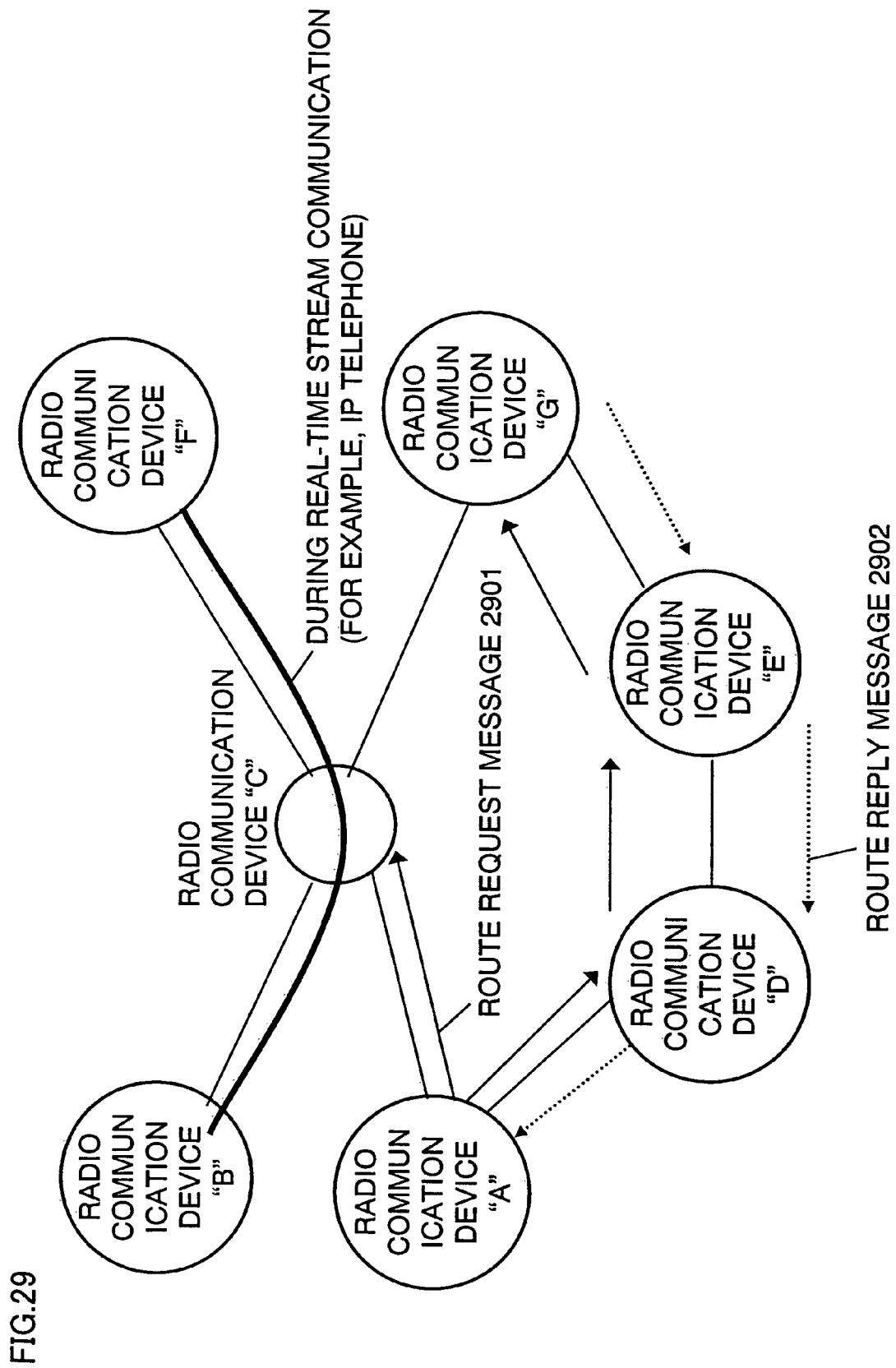
FIG. 29 is a diagram showing an operation when the radio communication device according to the embodiment 6 obtains a route by transmitting the route request message.

FIG. 29 is a schematic diagram showing the way of obtaining a route by transmitting a route request message from the radio communication device, and the actual operation of the route discovery processing will be explained using the drawing. In FIG. 29, the way in which a radio communication device "A" performs the route discovery for performing real-time communication with a radio communication device "G" is shown.

First, the radio communication device "A" broadcasts the route request message because it does not have route information of the radio communication device "G" at first. A radio communication device "C" and a radio communication device "D" existing in the neighborhood of the radio communication device "A" receive the route request message. When the radio communication device "C" receives the route request message, it checks route information in its routing table 107. In the case of FIG. 29, the radio communication device "C" has the route to the radio communication device "G", but when the route request message management unit 2409 verifies the state of the buffer for a real-time stream, a real-time stream packet from a radio communication device "B" addressed to a radio communication device "F" exists in the buffer and there is not enough available capacity, therefore, the radio communication device "C" does not relay-transmit the route request message.

On the other hand the radio communication device "D" and a radio communication device "E" do not have any data flow during the relay processing, and therefore the route request message is relay-forwarded as usual. In the end, the route request message is relay-forwarded to the radio communication device "G", and the radio communication device "G", being the destination, creates the route reply message addressed to the radio communication device "A" and sends it back. The route reply message arrives at the radio communication device "A", passing through the radio communication device "E" and the radio communication device "D". According to such processing, the radio communication device "A"

can obtain the route information to the radio communication device "G" for performing real-time communication.

In the above manner, a route selected giving preference to radio communication devices having much available capacity in their buffer can be obtained, and therefore, processing loads of the radio communication devices can be leveled. As a result, when a radio communication device having a high processing load has been previously set in the route and the processing load exceeds the tolerance level, the route request messages broadcast and processes for selecting an alternative radio communication device in the neighborhood in order to decentralize the processing load becomes fewer, and therefore a route suitable for the flow type can be obtained without increasing the frequency of transmitting the route control message.

In the embodiment, when the relay of the route request message is performed, as shown in the embodiments 1 to 5, it is possible that the delay time for delaying transmission time of the route request message is set by combining battery remaining power information, neighboring radio communication device information, the number of entries in the neighboring relay table or the number of entries of route information, and that the relay processing of the route request message is stopped when the same route request message has been transmitted from all radio communication devices located in the neighborhood, whereby the same effect as the embodiments 1 to 5 can be obtained.

At that time, the maximum time of route reply, the allowable hop count, the resolution or the resolution and the contents thereof, the standard number of neighboring radio communication devices, and the standard number of valid data entries of routes can be defined as system parameters of the radio communication devices included in the ad hoc network, or can be prescribed by the source radio communication device which creates and transmits the route request message and, after adding new fields in the route request message, stored in those fields. In this case, an allowable forwarding delay amount from the source radio communication device to the destination radio communication device is determined according to the flow type of data transmitted by the radio communication device, and the hop count can be determined so that communication is performed only within the satisfactory range of this forwarding delay amount, and therefore the quality of data forwarding service becomes stable. Accordingly, communication exceeding the range where there is satisfactory quality of data forwarding service can be prevented.

Embodiment 7

Figure 30:
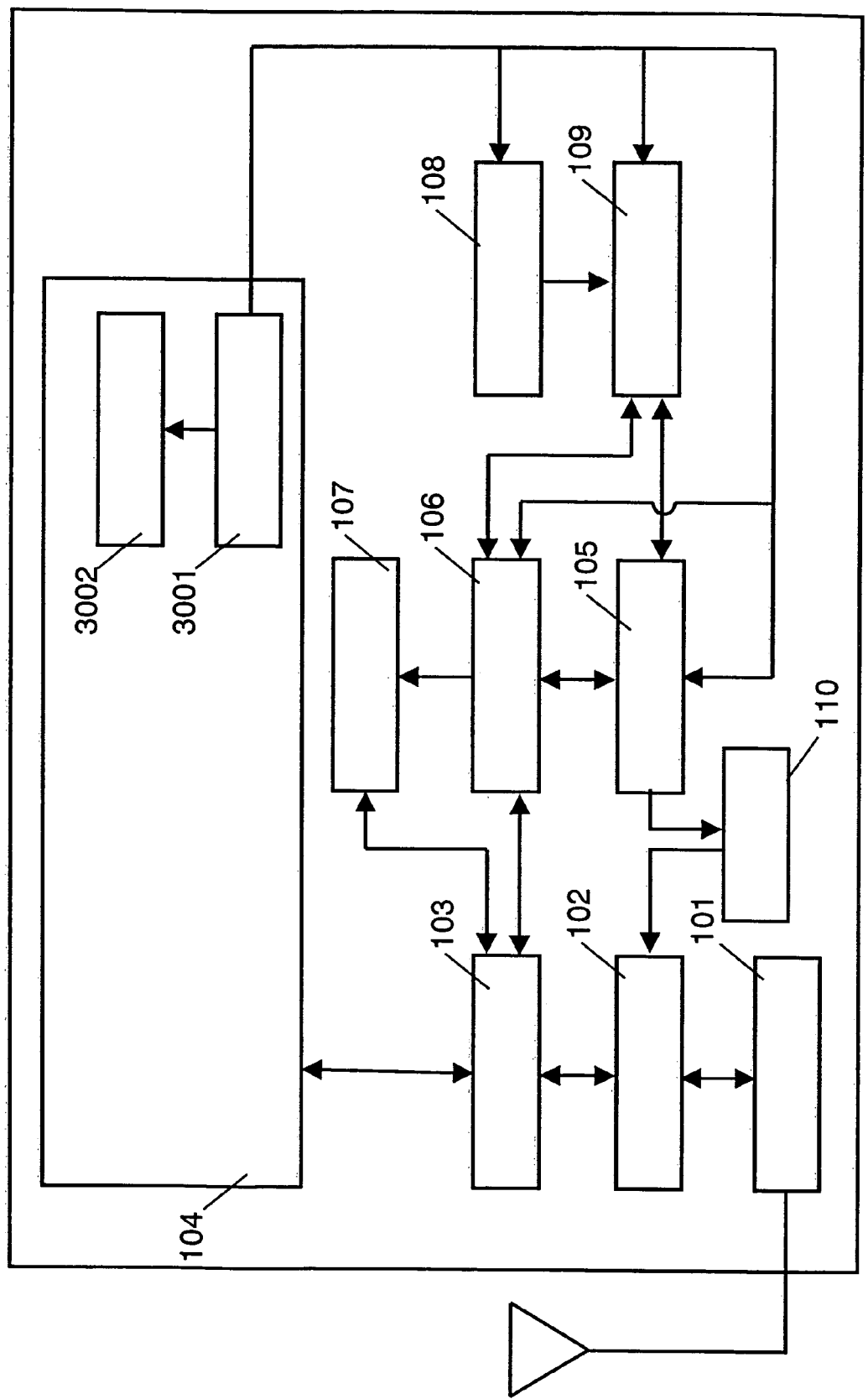
FIG. 30 is a diagram showing a configuration of a radio communication device according to an embodiment 7 of the invention.

FIG. 30 shows a configuration example of a radio communication device according to an embodiment 7 of the invention.

In FIG. 30, the configuration differs from the embodiment 1 in that a mode selection unit 3001 and a mode display unit 3002 are provided in the upper layer processing unit 104.

The mode selection unit 3001 enables a user of the radio communication device to intentionally set the relay processing to be impossible. For example, the user selects a mode impossible switch or relay impossible/possible modes in the mode selection from a command menu displayed at the display unit 3002. The user can also directly input a command for setting prohibition/allowance to the mode selection unit 3001 by a text format or a command line. The delay processing unit 105 and the route control message processing unit 106 accordingly make the relay processing impossible/possible.

The display unit 3002 displays the present relay mode.

According to the configuration, the mode selection unit 3001, when the relay mode is selected to be impossible mode, notifies the remaining battery capacity monitor unit 108, the route request message management unit 109 and the delay processing unit 105 to stop their functions. When the remaining battery capacity monitor unit 108 and the like receive the notification, they stop the relay functions including the delay processing.

According to the above, the radio communication device can be prevented from becoming a relay device when the user does not desire that, so that packet transmission for the relay can be prevented, and as a result, power consumption of the radio communication device can be suppressed.

The embodiment 7 is described based on the radio communication device of the embodiment 1, but it is also possible to add a similar configuration to the embodiments 2 to 6. In this case, the same effect can be obtained by stopping functions of the neighborhood relay table, the neighborhood table management unit, the route number information management unit, the route request message management unit and the relay processing unit.

Embodiment 8

Figure 31:
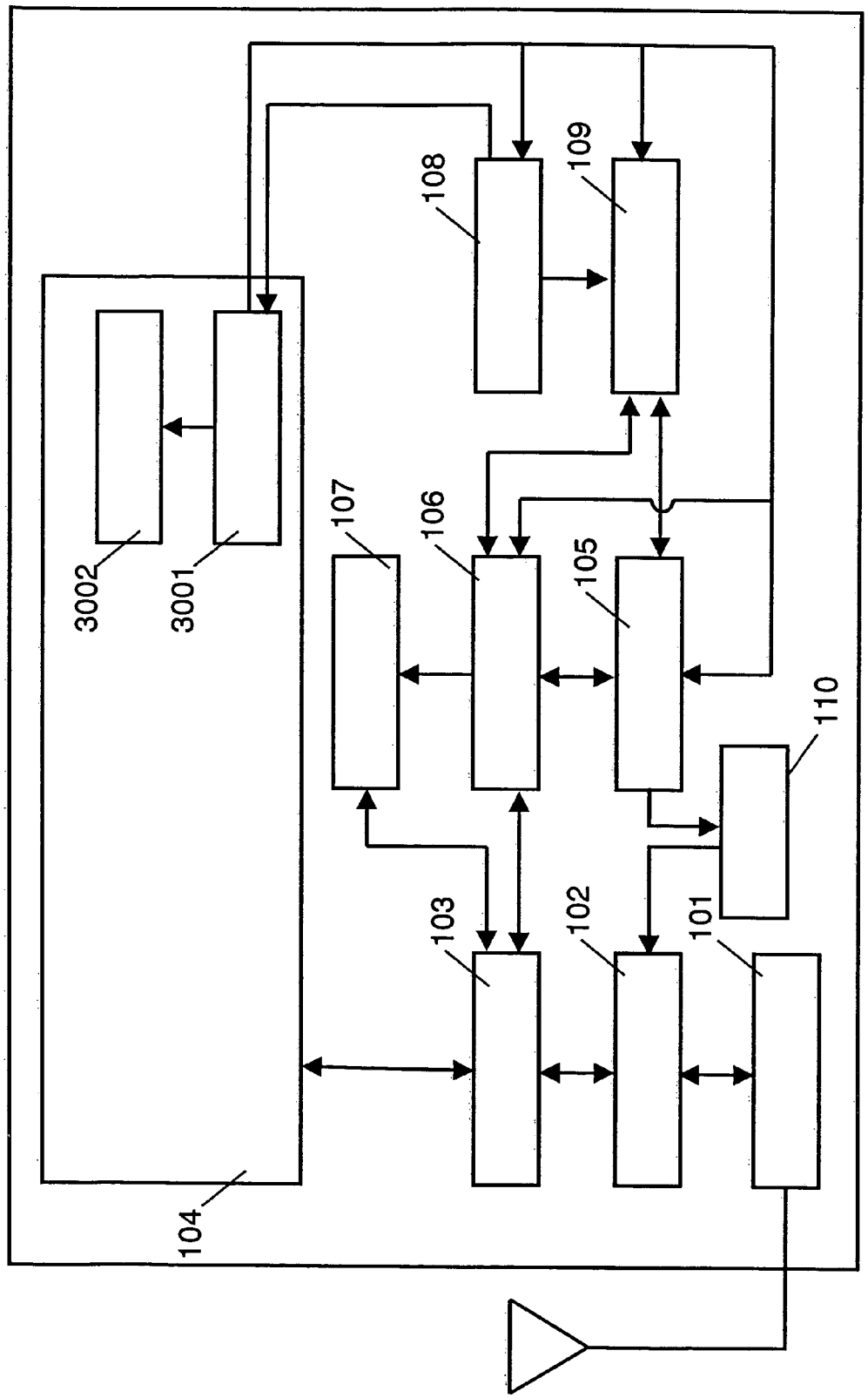
FIG. 31 is a diagram showing a configuration of a radio communication device according to an embodiment 8 of the invention.

FIG. 31 shows a configuration example of a radio communication device according to an embodiment 8 of the invention.

In FIG. 31, the configuration differs from the embodiment 7 in that the remaining battery capacity monitor unit 108 instructs the mode selection unit 3001 to set possible/impossible modes for the relay processing.

Specifically, when an operating state is worse than a specific threshold value (for example, the battery remaining power is 20% or less, or the number of neighboring radio communication devices is 12 or more), the remaining battery capacity monitor unit 108 sets the mode selection unit 3001 to the impossible mode. When the operating state is improved, the remaining battery capacity monitor unit 108 sets the mode selection unit 3001 to the possible mode. It is also possible, by having the mode selection unit 3001 instruct the receiving mode setting unit 110, to delete received route request messages whose destination is not that radio communication device, and not to perform a relay trial of the route request message when the operating state is worse than the threshold value.

According to this, under specific conditions, the relay of data communication of another radio communication device can be avoided. Deterioration of stability of a communication route due to selection of a radio communication device whose operating state is worse as the relay device can be prevented. Further, the deterioration of operating state of the radio communication device itself can be prevented.

Embodiment 9

Figure 32:
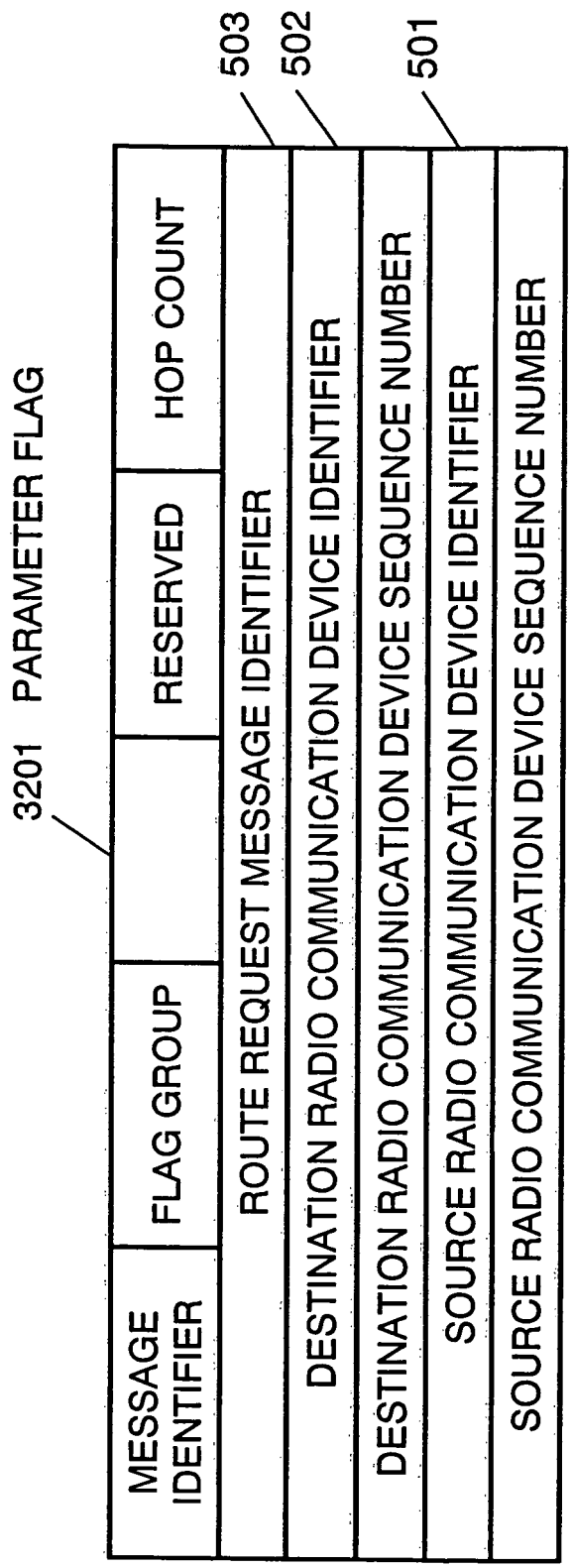
FIG. 32 is a table showing a format of a route request message according to an embodiment 9 of the invention.

An embodiment 9 of the invention is different in that a parameter flag 3201 is provided, which explicitly indicates which parameter (specifically, the battery remaining power, the number of neighboring radio communication devices, the information of the number of valid entries of routes and the like) should be used as the operating state of the radio communication device as shown in FIG. 32 with respect to the format of the route request message shown in FIG. 5. FIG. 32 is a format of the route request message. The configuration of the radio communication device of the embodiment is same as the configuration of the embodiment.

The radio communication device of the embodiment decides the delay amount by the operating state of the parameter shown by the parameter flag 3201. For example, a parameter flag field is made to be 4-bits, and when the parameter flag is "1001", the delay amount is set in accordance with the battery remaining power, and when it is "1002", the delay amount is set in accordance with the total number of neighboring radio communication devices. Unique values with respect to other operating states also can be set.

In the embodiment 9, the parameter flag is shown as an example so as to specify one operating state for deciding the delay amount, but it is possible that plural operating states are specified so that, for example, in the case of "0101" the delay amount is decided according to a combination of the battery remaining power and the total number of neighboring radio communication devices taken to be the operating state.

According to this, the operating state applied for searching the optimum route by the radio communication device can be decided flexibly in accordance with the communication data or the surrounding environment, regardless of whether a communication session is underway or not. Thus, the radio communication device of the embodiment can obtain a more preferable route depending on the usage status.

The formula for calculating the delay amount in the embodiment of the invention is an example, and can be decided in any way as long as the formula makes the delay amount smaller when the operating state of the radio communication device is better and makes the delay amount larger when the state is worse. The delay amount in the embodiment of the invention is exemplified making actual time the standard unit, but the unit to be the standard (time unit) may be prescribed separately and that unit may be used as the standard.

Industrial Applicability

The invention is a radio communication device performing a route discovery by a route request message, useful as a radio communication device which can be a relay device in an ad hoc network, an autonomous decentralized communication network or the like.

The invention claimed is:

1. A route discovery method for obtaining route information to a destination when a radio communication device connected in a network requires route information to a destination radio communication device, comprising:
 a step in which a radio communication device receives a route request message broadcasted on the network, which includes a source address, a destination address, and a route request message identifier;
 a step in which the radio communication device decides a delay amount for delaying processing of response transmission or relay forwarding with respect to the route request message, based on the operating state of the radio communication device, in response to the route request message, when the received route request message is not one which has already been received, and the radio communication device itself is not the destination of the required route;
 a step in which the radio communication device times the delay amount and judges whether time has expired or not;
 a step in which the radio communication device performs response transmission or relay forwarding with respect to the route request message when the delay amount time has expired, and
 a step in which the radio communication device stores an identifier in the route request message, which identifies the operating state for deciding the delay amount; and
 a step in which the radio communication device discriminates the identifier which identifies the operating state for deciding the delay amount and which is stored in the received route request message, and
 wherein the radio communication device decides the delay amount based on the operating state determined according to information of the operating state assigned by the identifier which identifies the operating state.

2. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:
 a route control message processing unit judging whether the received route request message is addressed to itself or not;
 a route request message management unit having a function of deciding a delay amount for delaying performance of response transmission or relay forwarding with respect to the route request message, based on the operating state of the radio communication device, when the route control message processing unit judges that the route request message is not addressed to itself;
 a delay processing unit having a function of measuring the delay amount and performing response transmission or relay forwarding with respect to the route request message when the delay amount time has expired; and
 a remaining battery capacity monitor unit having a function of monitoring battery remaining power of the radio communication device, and
 wherein said route request message management unit takes the battery remaining power to be the operating state of the radio communication device, and sets the delay amount to be smaller when the battery remaining power is larger, or when the estimated value of operating time calculated based on the battery remaining power is larger, or when the transmittable number of bits calculated by the battery remaining power is larger.

3. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:
 a route control message processing unit judging whether the received route request message is addressed to itself or not;
 a route request message management unit having a function of deciding a delay amount for delaying performance of response transmission or relay forwarding with respect to the route request message, based on the operating state of the radio communication device, when the route control message processing unit judges that the route request message is not addressed to itself;
 a delay processing unit having a function of measuring the delay amount and performing response transmission or relay forwarding with respect to the route request message when the delay amount time has expired; and a processing load monitor unit having a function of monitoring the CPU usage state of the radio communication device, and wherein said route request message management unit takes the CPU usage state of the radio communication device to be the operating state of the radio communication device and sets the delay amount smaller when a CPU usage rate is smaller.

4. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:

a route control message processing unit judging whether the received route request message is addressed to itself or not;

a route request message management unit having a function of deciding a delay amount for delaying performance of response transmission or relay forwarding with respect to the route request message, based on the operating state of the radio communication device, when the route control message processing unit judges that the route request message is not addressed to itself;

a delay processing unit having a function of measuring the delay amount and performing response transmission or relay forwarding with respect to the route request message when the delay amount time has expired; and a flow identification processing unit having a function when the radio communication device is the transmission source and transmits a data packet or when the radio communication device forwards a data packet from another radio communication device, of identifying the flow type of the data packet;

a buffer management unit having a function of storing transmission data and forwarding data whose flow types are specified by said flow identification processing unit in predetermined storage areas provided according to the flow type and examining available capacities of the respective storage areas, and a route request message management unit which also has a function of judging the flow type of data transmitted from the source of the route request message based on the received route request message, and wherein said route request message management unit takes the available capacity to be the operating state of the radio communication device when the available capacity of the storage area for the flow type of data transmitted from the source of the route request message is more than a predetermined value, and sets the delay amount to be smaller when the available capacity is larger.

5. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:

a route control message processing unit judging whether the received route request message is addressed to itself or not;

a route request message management unit having a function of deciding a delay amount for delaying performance of response transmission or relay forwarding with respect to the route request message, based on the operating state of the radio communication device, when the route control message processing unit judges that the route request message is not addressed to itself;

a delay processing unit having a function of measuring the delay amount and performing response transmission or relay forwarding with respect to the route request message when the delay amount time has expired; and a neighborhood table management unit having a function of managing information concerning neighboring radio communication devices with which the radio communication device can directly communicate, recording and updating the information, and wherein said route request message management unit takes the total number of neighboring radio communication devices with which the radio communication device can directly communicate to be the operating state of the radio communication device and sets the delay amount to be smaller when the total number of neighboring radio communication devices is fewer.

6. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:

a route control message processing unit judging whether the received route request message is addressed to itself or not;

a route request message management unit having a function of deciding a delay amount for delaying performance of response transmission or relay forwarding with respect to the route request message, based on the operating state of the radio communication device, when the route control message processing unit judges that the route request message is not addressed to itself;

a delay processing unit having a function of measuring the delay amount and performing response transmission or relay forwarding with respect to the route request message when the delay amount time has expired; and a route recording unit having a function of setting validity or invalidity of route information to respective desired destinations; and a route information recording unit having a function of recording information of the number of valid entries of routes stored in said route recording unit, wherein said route request message management unit takes information of the number of valid entries of routes to be the operating state of the radio communication device and sets the delay amount to be smaller when the number of valid entries is smaller.

7. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:

a route control message processing unit judging whether the received route request message is addressed to itself or not;

a route request message management unit having a function of deciding a delay amount for delaying performance of response transmission or relay forwarding with respect to the route request message, based on the operating state of the radio communication device, when the route control message processing unit judges that the route request message is not addressed to itself;

a delay processing unit having a function of measuring the delay amount and performing response transmission or relay forwarding with respect to the route request message when the delay amount time has expired; and a mode selection unit having a function of prohibiting or allowing response transmission or relay forwarding in response to the received route request message, and wherein said mode selection unit prohibits response transmission and relay forwarding in response to the route request message when the operating state does not satisfy a specific condition, and allows response transmission or relay forwarding in response to the route request message only when the operating state is better than the specific condition.

8. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:

a route control message processing unit judging whether the received route request message is addressed to itself or not;

a route request message management unit having a function of deciding a delay amount for delaying performance of response transmission or relay forwarding with respect to the route request message, based on the operating state of the radio communication device, when the route control message processing unit judges that the route request message is not addressed to itself;

a delay processing unit having a function of measuring the delay amount and performing response transmission or relay forwarding with respect to the route request message when the delay amount time has expired; and a mode selection unit further having a function of selecting and inputting either the prohibition or allowance of response transmission or relay forwarding in response to the received route request message; and a display unit for displaying the operating mode which prohibits or allows response transmission or relay forwarding in response to the currently received route request message.

9. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:

a route control message processing unit judging whether the received route request message is addressed to itself or not;

a route request message management unit having a function of deciding a delay amount for delaying performance of response transmission or relay forwarding with respect to the route request message, based on the operating state of the radio communication device, when the route control message processing unit judges that the route request message is not addressed to itself;

a delay processing unit having a function of measuring the delay amount and performing response transmission or relay forwarding with respect to the route request message when the delay amount time has expired; and a receiving mode setting unit having a function of setting a data link control unit so that all frames on a radio link can be received, and wherein said receiving mode setting unit sets the receiving operation mode to an all-frame receivable mode when said delay processing unit starts measurement of the delay amount, instructing the stop of the measurement to said delay processing unit when said route control message processing unit detects a route reply message responding to the received route request message before the measurement of the delay amount is finished, and setting the data link control unit to be a normal frame receiving mode in which only a frame addressed to itself, a broadcast frame or a limited broadcast frame which must be received by the radio communication device are received from the radio link when the measured delay amount time has completely expired.

10. A radio communication device which, when route information to a destination radio communication device is required in a network in which data can be forwarded by multistage relays between plural radio communication devices, transmits a route request message to the destination in the network and receives a route reply message corresponding to the route request message and thus acquires route information, said radio communication device comprising:

a route control message processing unit judging whether the received route request message is addressed to itself or not;

a route request message management unit having a function of deciding a delay amount for delaying performance of response transmission or relay forwarding with respect to the route request message, based on the operating state of the radio communication device, when the route control message processing unit judges that the route request message is not addressed to itself;

a delay processing unit having a function of measuring the delay amount and performing response transmission or relay forwarding with respect to the route request message when the delay amount time has expired; and a neighborhood relay table having a function of managing the route request messages transmitted or relay-forwarded from neighboring radio communication devices, and wherein whether the route request message for which a delay amount is being measured has been transmitted or relay-forwarded from all neighboring radio communication devices or not during the measurement of the delay amount is judged, and said delay processing unit is instructed to stop the measurement when the radio communication device judges that the route request message has been transmitted or relay-forwarded from all neighboring radio communication devices.

* * * * *